US008848637B2

(12) United States Patent
Shindo et al.

(10) Patent No.: US 8,848,637 B2
(45) Date of Patent: Sep. 30, 2014

(54) MOBILE COMMUNICATION SYSTEM, BASE STATION, HIGHER-ORDER APPARATUS, COMMUNICATION METHOD, AND PROGRAM

(75) Inventors: Masato Shindo, Tokyo (JP); Yoshio Ueda, Tokyo (JP)

(73) Assignee: NEC Corporation, Tokyo (JP)

( * ) Notice: Subject to any disclaimer, the term of this patent is extended or adjusted under 35 U.S.C. 154(b) by 153 days.

(21) Appl. No.: 13/383,215

(22) PCT Filed: Jun. 7, 2010

(86) PCT No.: PCT/JP2010/059624
§ 371 (c)(1),
(2), (4) Date: Jan. 10, 2012

(87) PCT Pub. No.: WO2011/016285
PCT Pub. Date: Feb. 10, 2011

(65) Prior Publication Data
US 2012/0106498 A1 May 3, 2012

(30) Foreign Application Priority Data

Aug. 7, 2009 (JP) ................................. 2009-184758

(51) Int. Cl.
*H04W 4/00* (2009.01)
*H04J 13/00* (2011.01)
*H04W 48/08* (2009.01)
*H04W 28/26* (2009.01)
*H04W 92/20* (2009.01)
*H04W 72/00* (2009.01)

(52) U.S. Cl.
CPC ............ *H04J 13/0022* (2013.01); *H04W 48/08* (2013.01); *H04W 28/26* (2013.01); *H04W 92/20* (2013.01); *H04W 72/00* (2013.01)
USPC ........... 370/329; 370/335; 370/342; 370/331; 370/328; 370/252; 370/254; 370/310; 370/311; 370/330; 370/336

(58) Field of Classification Search
CPC ..... H04W 84/045; H04W 24/02; H04W 4/02; H04W 4/027; H04W 41/12; H04W 43/0835; H04W 43/0847; H04W 43/0888
USPC ......... 370/329, 441, 331, 328, 335, 342, 252, 370/254, 310, 311, 330, 336; 455/444, 562, 455/436, 422
See application file for complete search history.

(56) References Cited

U.S. PATENT DOCUMENTS 7,869,454 B2 * 1/2011 Hwang et al. .................. 370/441
8,032,142 B2 * 10/2011 Carter et al. ................... 455/444
(Continued)

FOREIGN PATENT DOCUMENTS

| CN | 101064860 | 10/2007 |
| JP | 10-013918 | 1/1998 |

(Continued)

OTHER PUBLICATIONS

R1-99c35, "Uplink Synchronization Transmission Scheme", Sep. 1999.*

(Continued)

*Primary Examiner* — Christopher Grey
*Assistant Examiner* — Oussama Roudani
(74) *Attorney, Agent, or Firm* — Young & Thompson

(57) ABSTRACT

A mobile communication system includes terminals and a plurality of base stations that use scrambling codes to perform radio communication with the terminals. Each of the plurality of base stations transmits to neighboring base stations information of the range of scrambling codes for uplink that is reserved in its own station, and when determining the range of scrambling codes for uplink to be reserved in its own station, receives from neighboring base stations information of the ranges of scrambling codes for uplink reserved in the neighboring base stations.

19 Claims, 31 Drawing Sheets

(56) References Cited

U.S. PATENT DOCUMENTS

| | | | |
|---|---|---|---|
| 8,412,274 B2 * | 4/2013 | Hoshina et al. | 455/562.1 |
| 2008/0188265 A1 | 8/2008 | Carter et al. | |
| 2008/0214212 A1 | 9/2008 | Pridmore et al. | |
| 2009/0135769 A1 * | 5/2009 | Sambhwani et al. | 370/329 |
| 2011/0081915 A1 * | 4/2011 | Maida et al. | 455/450 |

FOREIGN PATENT DOCUMENTS

| | | |
|---|---|---|
| JP | 10-051820 | 2/1998 |
| JP | 2000-083274 | 3/2000 |
| JP | 2002-335577 | 11/2002 |
| JP | 2003-250182 | 9/2003 |
| JP | 2005-142967 | 6/2005 |
| JP | 2007-274538 | 10/2007 |
| WO | 2005091667 | 9/2005 |

OTHER PUBLICATIONS

Ts.25.213.V8.4.0, "Spreading and modulation (FDD)", Mar. 2009.*

International Search Report, PCT/JP2010/059624, dated Aug. 31, 2010.

Miyazaki, NW based resolution of UL Scrambling code Collision, 3GPP TSG-RAN WG3 65bis, R3-092367, NEC Corp., Oct. 2009.

3GPP TS 25.213 v8.4.0, 3rd Generation Partnership Project; Technical Specification Group Radio Access Network; Spreading and modulation, FDD, Release 8, Mar. 2009.

3GPP TS 25.331 v8.7.0, 3rd Generation Partnership Project; Technical Specification Group Radio Access Network; Radio Resource Control, RCC, Protocol Specification, Release 8, Jun. 2009.

JP Office Action dated Apr. 1, 2014, with English Translation; Application No. 2011-525826.

CN Office Action dated Jan. 24, 2014, with English Translation; Application No. 201080034973.7.

* cited by examiner

Fig.4

Reserved UL Scrambling Code Range

| Information Element/Group name | Need | Multi | Type and reference |
|---|---|---|---|
| Reserved UL Scrambling Code Range List | MP | 1 to <maxNumofULScramblingCodeRangeLists> | |
| > Reserved UL Scrambling Code Range Start | MP | | Integer(8192..16777215) |
| > Reserved UL Scrambling Code Range Offset | MP | | Integer(0..16769023) |

| Constant | Explanation | Value |
|---|---|---|
| maxNumofULScramblingCodeRangeLists | Maximum Number of UL Scrambling Code Rage Lists | 16 |

Fig.5

Reserved UL Scrambling Code Range

| Information Element/Group name | Need | Multi | Type and reference |
|---|---|---|---|
| Reserved UL Scrambling Code Range List | MP | 1 | |
| > Reserved UL Scrambling Code Range Start | MP | | 8192 |
| > Reserved UL Scrambling Code Range Offset | MP | | 4 |

Fig.6

UL Scrambling Code Range Database

| Cell # | UL Scrambling Code Range | | | | | | |
|---|---|---|---|---|---|---|---|
| | 1 | | 2 | | ... | 16 | |
| | Start | Offset | Start | Offset | ... | Start | Offset |
| 1 | 8192 | 4 | : | : | ... | : | : |
| 2 | : | : | : | : | ... | : | : |
| ... | ... | ... | ... | ... | ... | ... | ... |
| i | : | : | : | : | ... | : | : |

Fig.10

Reserved UL Scrambling Code Range Response

| IE/Group Name | Presence | Range | IE Type and Reference | Semantics Description | Criticality | Assigned Criticality |
|---|---|---|---|---|---|---|
| Reserved UL Scrambling Code Range List | | 1..<maxNumofUL ScramblingCo deRangeLists> | | | EACH | reject |
| > Reserved UL Scrambling Code Range Start | M | | Integer(8192..1 6777215) | | = | |
| > Reserved UL Scrambling Code Range Offset | M | | Integer(0..1676 9023) | | | |

| Range bound | Explanation | Value |
|---|---|---|
| maxNumofULScramblingCodeRangeLists | Maximum Number of UL Scrambling Code Rage Lists | 16 |

Fig.16

UL Scrambling Code Range Database

| HNB identity | Reserved UL Scrambling Code Range | | | | | | | |
|---|---|---|---|---|---|---|---|---|
| | 1 | | 2 | | ... | | 16 | |
| | Start | Offset | Start | Offset | ... | ... | Start | Offset |
| A | 8192 | 4 | - | - | ... | ... | - | - |
| B | - | - | 8196 | 4 | ... | ... | - | - |
| ... | ... | ... | ... | ... | ... | ... | ... | ... |
| Z | - | - | - | - | ... | ... | 25647 | 8 |

Fig.17

| Hardware Version | Maximum number of UL Scrambling Codes that can be assigned |
|---|---|
| xxxx | 4 |
| yyyy | 8 |
| zzzz | 16 |

Fig.18

| Name | Type | Write | Description | Object Default |
|---|---|---|---|---|
| .FAPService.{i}.CellConfig.UMTS.RAN.FDDF AP.RF.ULScramblingCodeRange.{i} | object | - | | |
| .FAPService.{i}.FAPControl.UMTS.SelfConfig. ULScramblingCodeRange.{i}.start | unsignedInt[.16777215] | W | | - |
| .FAPService.{i}.FAPControl.UMTS.SelfConfig. ULScramblingCodeRange.{i}.offset | unsignedInt[.16769024] | W | | - |

Fig.22

UE REGISTER ACCEPT

| PARAMETER | PRESENCE | RANGE | IE Type and Reference | Semantics Description | Criticality | Assigned Criticality |
|---|---|---|---|---|---|---|
| Message Type | M | | 9.2.1 | | YES | reject |
| UE Identity | M | | 9.2.17 | | YES | reject |
| Context-ID | M | | 9.2.9 | | YES | reject |
| UL Scrambling code number | M | | INTEGER (0.. 16777215) | | YES | reject |

Fig.26

HNB REGISTER ACCEPT

| PARAMETER | PRESENCE | RANGE | IE Type and Reference | Semantics Description | Criticality | Assigned Criticality |
|---|---|---|---|---|---|---|
| Message Type | M | | 9.2.1 | | YES | reject |
| RNC-ID | M | | 9.2.26 | | YES | reject |
| Reserved UL Scrambling Code Range List | | 1..<maxNumofULScramblingCodeRangeLists> | | | EACH | reject |
| > Reserved UL Scrambling Code Range Start | M | | Integer(81 92..16777 215) | | = | |
| > Reserved UL Scrambling Code Range Offset | M | | Integer(0.. 16769023) | | | |

| Range bound | Explanation | Value |
|---|---|---|
| maxNumofULScramblingCodeRangeLists | Maximum Number of UL Scrambling Code Rage Lists | 16 |

Fig.31

|   | 1 Octet | 2 Octet | 3 Octet |
|---|---------|---------|---------|
| 1 | 17 | 9  | 1 |
| 2 | 18 | 10 | 2 |
| 3 | 19 | 11 | 3 |
| 4 | 20 | 12 | 4 |
| 5 | 21 | 13 | 5 |
| 6 | 22 | 14 | 6 |
| 7 | 23 | 15 | 7 |
| 8 | 24 | 16 | 8 |

MOBILE COMMUNICATION SYSTEM, BASE STATION, HIGHER-ORDER APPARATUS, COMMUNICATION METHOD, AND PROGRAM

TECHNICAL FIELD

The present invention relates to a mobile communication system, a base station, a higher-order apparatus, a communication method, and a program.

BACKGROUND ART

In a CDMA (Code Division Multiple Access) mobile communication system, scrambling codes are used in communication between a Node-B (base station) and UE (User Equipment).

The following explanation regards scrambling codes.

There are two types of scrambling codes: scrambling codes for UL (Uplink) and scrambling codes for DL (Downlink). UL scrambling codes are used for identifying UE, and DL scrambling codes are used for identifying cells. A cell is an area in which Node-B provides service.

There are 8192 DL scrambling codes, and the scrambling codes are divided into 512 groups of 16 codes apiece. In other words, there are 16 scrambling codes from 0, 1, . . . , to 15 in each group, the 0th scrambling code being called the primary scrambling code and the other codes being called secondary scrambling codes. In each cell, the primary scrambling code is used without fail, and the secondary scrambling codes may be used in addition.

A UL scrambling code is made up by 24 bits. In other words, there are 16777216 UL scrambling codes. The physical channels of physical layers in UL are broadly divided between two types: PRACH (Physical Random Access Channels) and UL DPCH (Dedicated Physical Channels). The 3GPP (3rd Generation Partnership Project) standards specify that the 8192 UL scrambling codes from the 0th to the 8191th codes are to be used for PRACH (Non-Patent Document 1). In other words, the 8192nd and following UL scrambling codes are used for DPCH.

There are two parts in PRACH: the Preamble Part and the Message Part. The 3GPP standards specify that either the primary scrambling code that is used in the DL of the same cell or the scrambling codes of the same group (0, 1, . . . , 511) are to be applied to the UL scrambling code used in the PRACH Preamble Part (Non-Patent Document 1). The 3GPP standards (Non-Patent Document 2) further specify that Node-B reports to its own cell the number (0 . . . 15) of the scrambling code in the same group as the DL scrambling code of its own cell that is to be used in PRACH in a message of SIB5 (System Information Block type 5) or SIB6 (System Information Block type 6). If the same DL scrambling code group is being used in an adjacent cell, UE will encounter difficulty in identifying the cell and will become unable to communicate normally with Node-B. As a result, Node-B basically does not use a DL scrambling code group that is the same as that of a neighboring cell and the UL scrambling code of a PRACH Preamble part is not duplicated between adjacent cells. It is determined in the 3GPP standards that in the PRACH Message Part, values that are shifted by 4096 from the UL scrambling code of the PRACH Preamble Part are to be applied as input to a code generator, whereby different codes are used even when the code identification numbers are identical (Non-Patent Document 1).

In UL DPCH, the 8192nd and succeeding UL scrambling codes among the 16777216 UL scrambling codes can be used as described hereinabove, and the UL scrambling code range that can be used is therefore broad. As a result, the potential for duplication of UL scrambling codes is low and assignment logic is therefore not specially determined in the 3GPP standards.

LITERATURE OF THE PRIOR ART

Patent Documents

Non-Patent Document 1: 3GPP TS25.213
Non-Patent Document 2: 3GPP TS25.331

SUMMARY OF THE INVENTION

Problem to be Solved by the Invention

Recently, however, small base stations referred to as HNB (Home Node B: residential base station) that are assumed to be used in homes are being investigated. In the following explanation, an existing Node-B will be referred to as a "Macro Node-B" to distinguish it from a Home Node-B.

It is expected that in the near future, such HNB will be arranged in large numbers under the control of Macro Node-B as shown in FIG. 1.

In FIG. 1, it is assumed that RNC (Radio Network Controller: base station control apparatus) 1005, Macro NodeB (#1 and #2) 1001 and 1002 that are subordinate to this RNC 1005, and HNB that are subordinate to Macro NodeB 1001 and 1002 are manufactured by vendor A. In addition, RNC 1006, Macro NodeB (#3 and #4) 1003 and 1004 that are subordinate to RNC 1006, and HNB that are subordinate to Macro NodeB 1003 and 1004 are assumed to be manufactured by vendor B.

Currently, however, the assignment logic of UL scrambling codes of UL DPCH in a base station is not determined by 3GPP standards as described hereinabove, and the method of assignment depends on the installation of the vendor of each base station.

As a result, the potential exists that the UL scrambling code of the UL DPCH for an HNB that is arranged at the boundary of the cell of Macro NodeB (#2) 1002 and the cell of Macro NodeB (#3) 1003 will duplicate that of a neighboring HNB or neighboring Macro NodeB that is manufactured by a different vendor.

Alternatively, depending on the vendor's method of installation, the potential exists that the UL scrambling code of the UL DPCH of an HNB will duplicate that of a neighboring HNB or neighboring Macro NodeB that is manufactured by the same vendor.

In a CDMA mobile communication system, the use of different UL scrambling codes for each UE enables an HNB to identify UE and carry out normal communication even when the same frequency is used at the same timing.

However, if the same UL scrambling codes are used by UE that is subordinate to the same HNB or by UE that is subordinate to a neighboring HNB or by a neighboring Macro NodeB, the HNB will encounter difficulty in identifying the UE and will no longer able to perform normal communication with the UE.

It is therefore an object of the present invention to provide a mobile communication system, a base station, a higher-order apparatus, a communication method, and a program that can avoid the duplication of UL scrambling codes among neighboring base stations and thus provide a solution to the above-described problem.

Means for Solving the Problem

The first mobile communication system of the present invention is a mobile communication system that includes terminals and a plurality of base stations that use scrambling codes to carry out radio communication with the terminals, wherein each of the plurality of base stations:

transmits to neighboring base stations information of the range of uplink scrambling codes that are reserved in that base station; and when determining the range of uplink scrambling codes that are reserved in its own station, receives from neighboring base stations information of the ranges of uplink scrambling codes that are reserved in the neighboring base stations.

The second mobile communication system of the present invention is a mobile communication system that includes terminals, a plurality of base stations that use scrambling codes to carry out radio communication with the terminals, and a higher-order apparatus that has under its control the plurality of base stations, wherein the higher-order apparatus:

assigns to subordinate base stations uplink scrambling codes that have not yet been assigned to other base stations as the uplink scrambling codes that can be used in the subordinate base stations; and transmits to subordinate base stations information of the uplink scrambling codes that have been assigned.

The third mobile communication system of the present invention is a mobile communication system that includes terminals and a plurality of base stations that use scrambling codes to carry out radio communication with the terminals; wherein each of the plurality of base stations:

when determining the range of scrambling codes of a first physical channel for uplink that are used in its own station, sets downlink scrambling codes of a group that differs from the downlink scrambling codes that are used in neighboring base stations; and sets the downlink primary scrambling code that is set in its own station in bits that make up the scrambling codes of the first physical channel for uplink that is used in its own station.

The first base station of the present invention is a base station that uses scrambling codes to carry out radio communication with terminals, and includes:

a communication unit that transmits to neighboring base stations information of the range of uplink scrambling codes that are reserved in its own station, and, when determining the range of uplink scrambling codes that are reserved in its own station, receives from the neighboring base stations information of the ranges of uplink scrambling codes that are reserved in the neighboring base stations.

The second base station of the present invention is a base station that uses scrambling codes to carry out radio communication with the terminals, and includes a control unit that:

when determining the range of scrambling codes of a first physical channel for uplink that is used in its own station, sets downlink scrambling codes of a group that differs from the downlink scrambling codes that are used in neighboring base stations, and sets a primary scrambling code for downlink that is set in its own station to bits that make up the scrambling codes of the first physical channel for uplink that is used in its own station.

The higher-order apparatus of the present invention is a higher-order apparatus that has under its control a plurality of base stations that use scrambling codes to carry out radio communication with terminals, and includes:

a control unit that assigns to subordinate base stations uplink scrambling codes that have not yet been assigned to other base stations as uplink scrambling codes that can be used in the subordinate base stations; and a communication unit that transmits to subordinate base stations information of the uplink scrambling codes that have been assigned.

The first communication method of the present invention is a communication that is realized by a mobile communication system that includes terminals and a plurality of base stations that use scrambling codes to carry out radio communication with the terminals, and includes steps of:

each of the base stations transmitting to neighboring base stations information of the range of an uplink scrambling codes that are reserved in its own station; and the base station, when determining the range of the uplink scrambling codes that are reserved in its own station, receiving from neighboring base stations information of the ranges of uplink scrambling codes that are reserved in the neighboring base stations.

The second communication method of the present invention is a communication method that is realized by a mobile communication system that includes terminals and a plurality of base stations that use scrambling codes to carry out radio communication with the terminals, and includes steps of:

each of the base stations, when determining the range of scrambling codes of a first physical channel for uplink that is used in its own station, setting downlink scrambling codes of a group that differs from downlink scrambling codes that are used in neighboring base stations; and the base station setting a downlink primary scrambling code that is set in its own station to bits that make up the scrambling codes of the first physical channel for uplink that is used in its own station.

The third communication method of the present invention is a communication method that is realized by a mobile communication system that includes terminals, a plurality of base stations that use scrambling codes to carry out radio communication with the terminals, and a higher-order apparatus that has the plurality of base stations under its control, the communication method including steps of:

the higher-order apparatus assigning to subordinate base stations uplink scrambling codes that have not yet been assigned to other base stations as uplink scrambling codes that can be used by the subordinate base stations; and the higher-order apparatus transmitting to subordinate base stations information of the uplink scrambling codes that have been assigned.

The fourth communication method of the present invention is a communication method realized by a base station that uses scrambling codes to carry out radio communication with terminals, the communication method including steps of:

transmitting to neighboring base stations information of the range of uplink scrambling codes that are reserved in its own station; and when determining the range of uplink scrambling codes that are to be reserved in its own station, receiving from neighboring base stations information of the ranges of uplink scrambling codes that are reserved in the neighboring base stations.

The fifth communication method of the present invention is a communication method realized by a base station that uses scrambling codes to carry out radio communication with terminals, the communication method including steps of:

when determining the ranges of scrambling codes of a first physical channel for uplink to be used by its own station, setting downlink scrambling codes of a group that differs from the downlink scrambling codes that are used by neighboring base stations; and setting a primary scrambling code for downlink that is set in its own station to bits that make up scrambling codes of a first physical channel for uplink that is used in its own station.

The sixth communication method of the present invention is a communication method realized by a higher-order apparatus that has under its control a plurality of base stations that use scrambling codes to carry out radio communication with terminals, the communication method including steps of:

assigning to subordinate base stations uplink scrambling codes that have not yet been assigned to other base stations as uplink scrambling codes that can be used in the subordinate base stations; and transmitting to subordinate base stations information of the uplink scrambling codes that have been assigned.

The first program of the present invention is a program that causes a base station, which uses scrambling codes to carry out radio communication with terminals, to execute procedures of:

transmitting to neighboring base stations information of the range of uplink scrambling codes that are reserved in its own station; and when determining the range of uplink scrambling codes that are to be reserved in its own station, receiving information of the ranges of uplink scrambling codes that are reserved in the neighboring base stations.

The second program of the present invention is a program that causes a base station, which uses scrambling codes to carry out radio communication with terminals, to execute procedures of:

when determining the range of scrambling codes of a first physical channel for uplink that is to be used by its own station, setting the scrambling codes for downlink of a group that differs from scrambling codes for downlink that is used in neighboring base stations; and setting the primary scrambling code for downlink that is set in its own station to bits that make up scrambling codes of the first physical channel for uplink that is used in its own station.

The third program of the present invention is a program that causes a higher-order apparatus, which has under its control a plurality of base stations that use scrambling codes to carry out radio communication with terminals, to execute procedures of:

assigning to subordinate base stations uplink scrambling codes that have not yet been assigned to other base stations as uplink scrambling codes that can be used in the subordinate base stations; and transmitting to subordinate base stations information of the uplink scrambling codes that have been assigned.

Effect of the Invention

According to the first mobile communication system of the present invention, each base station transmits to neighboring base stations information of the range of uplink scrambling codes that are reserved in its own station.

Accordingly, each base station is able to learn the uplink scrambling codes that are reserved in neighboring base stations, whereby the effect is obtained that duplication of uplink scrambling codes among neighboring base stations can be avoided.

According to the second mobile communication system of the present invention, a higher-order apparatus assigns uplink scrambling codes that can be used in subordinate base stations.

Accordingly, the effect is obtained that duplication of uplink scrambling codes among neighboring base stations can be avoided.

According to the third mobile communication system of the present invention, each base station first sets downlink scrambling codes of a group that differs from the downlink scrambling codes that are being used in neighboring base stations and then sets the downlink primary scrambling code that is set in its own station to bits that make up the uplink scrambling codes that are used in its own station.

Because downlink scrambling codes that are different from those of neighboring base stations are thus contained in the UL scrambling codes that each base station sets, the effect can be obtained that duplication of uplink scrambling codes among neighboring base stations can be avoided.

BRIEF DESCRIPTION OF THE DRAWINGS

FIG. 4 shows an example of the setting method in which an HNB shown in FIG. 2 sets a Reserved UL Scrambling Code Range in a System Information message.

FIG. 5 shows a specific example of the method of setting the Reserved UL Scrambling Code Range shown in FIG. 4.

FIG. 6 shows an example of a database that shows the UL scrambling code range that is reserved by the neighboring HNB of the HNB shown in FIG. 2.

FIG. 10 shows an example of the setting method in which the HNB shown in FIG. 8 sets the Reserved UL Scrambling Code Range in a Reserved UL Scrambling Code Range Response message.

FIG. 16 shows an example of the database that shows the UL scrambling code ranges that the HMS shown in FIG. 14 assigns to subordinate HNB.

FIG. 17 shows an example of the database that shows the maximum number of UL Scrambling Codes that can be assigned for each Hardware Version of the HNB shown in FIG. 14.

FIG. 18 shows an example of the setting method by which the HMS shown in FIG. 14 sets UL scrambling code ranges in Data Mode 1 of HNB.

FIG. 22 shows an example of the setting method by which the HNB-GW shown in FIG. 20 sets a UL Scrambling Code in a UE REGISTER ACCEPT message.

FIG. 26 shows an example of the setting method by which the HNB-GW shown in FIG. 24 sets the UL scrambling code range in an HNB REGISTER ACCEPT message.

FIG. 31 shows a second example of the determination method by which the HNB shown in FIG. 28 determines a UL scrambling code range.

BEST MODE FOR CARRYING OUT THE INVENTION

Modes for implementing the present invention are next described with reference to the accompanying figures. In the following explanation, codes described as simply "UL scrambling codes" refer to UL scrambling codes of UL DPCH.

First Exemplary Embodiment

Figure 1:
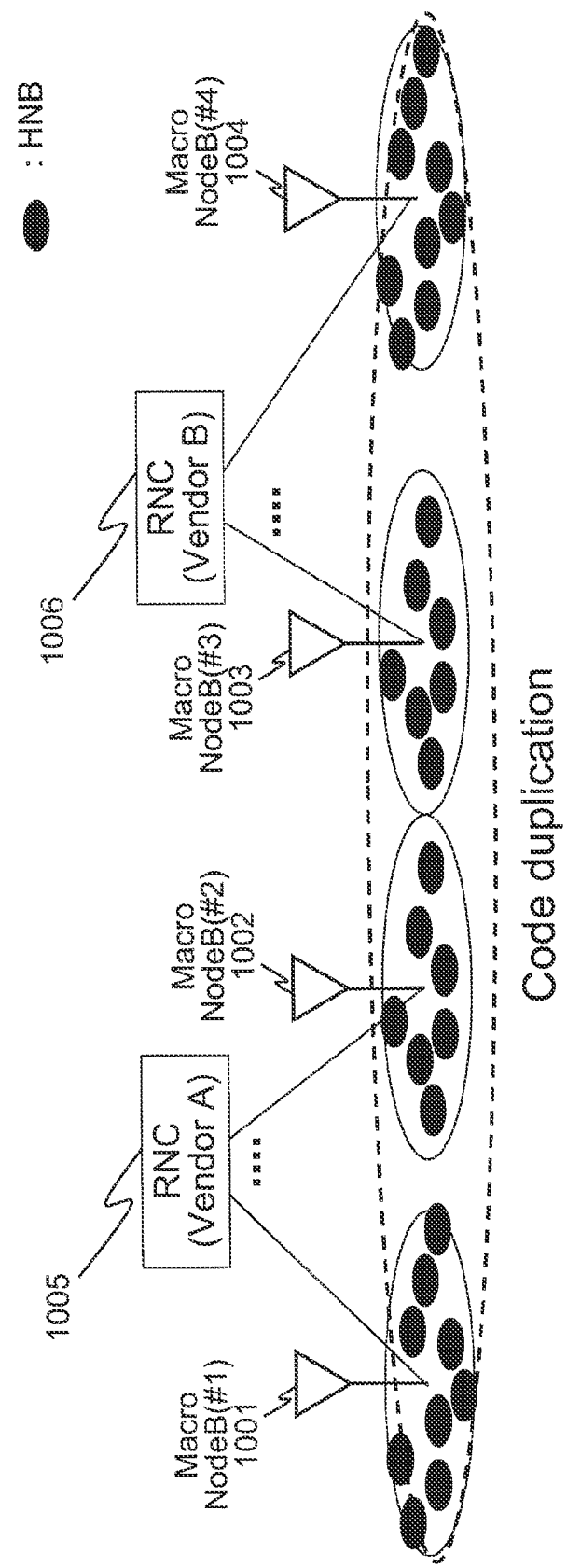
FIG. 1 shows the state in which HNBs are arranged subordinate to Macro NodeB in a mobile communication system.
Figure 2:
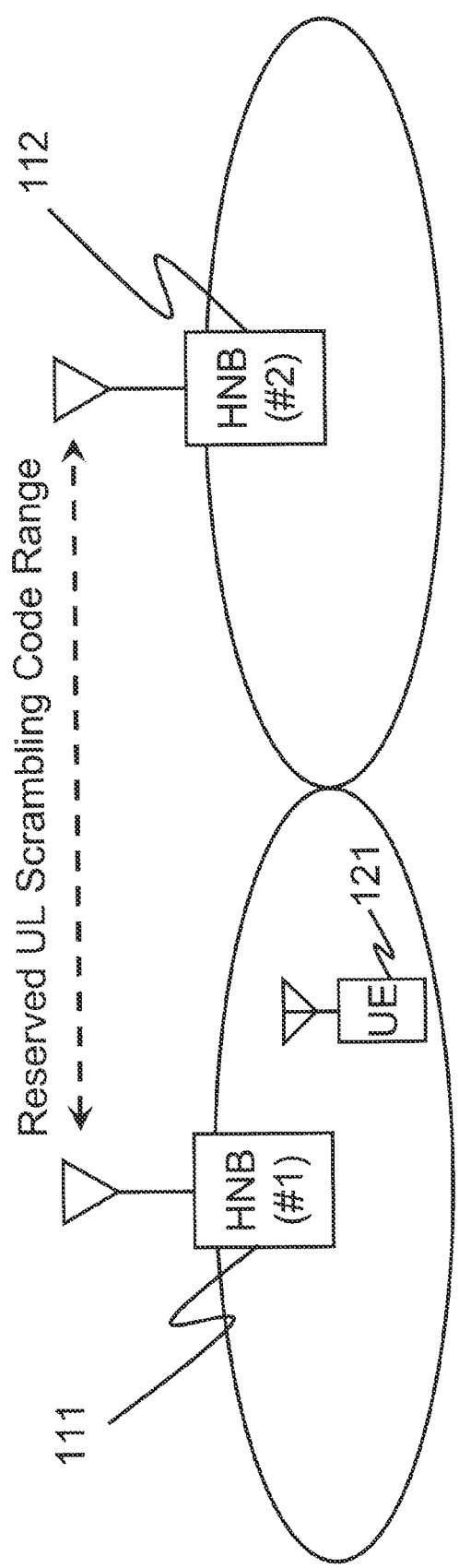
FIG. 2 shows the configuration of the mobile communication system of the first exemplary embodiment of the present invention.

Referring now to FIG. 2, the configuration of a portion of the mobile communication system of the present exemplary embodiment is shown.

The mobile communication system of the present exemplary embodiment includes: two HNB (#1) 111 and HNB (#2) 112, UE 121 that carries out radio communication with HNB (#1) 111 and HNB (#2) 112.

Figure 3:
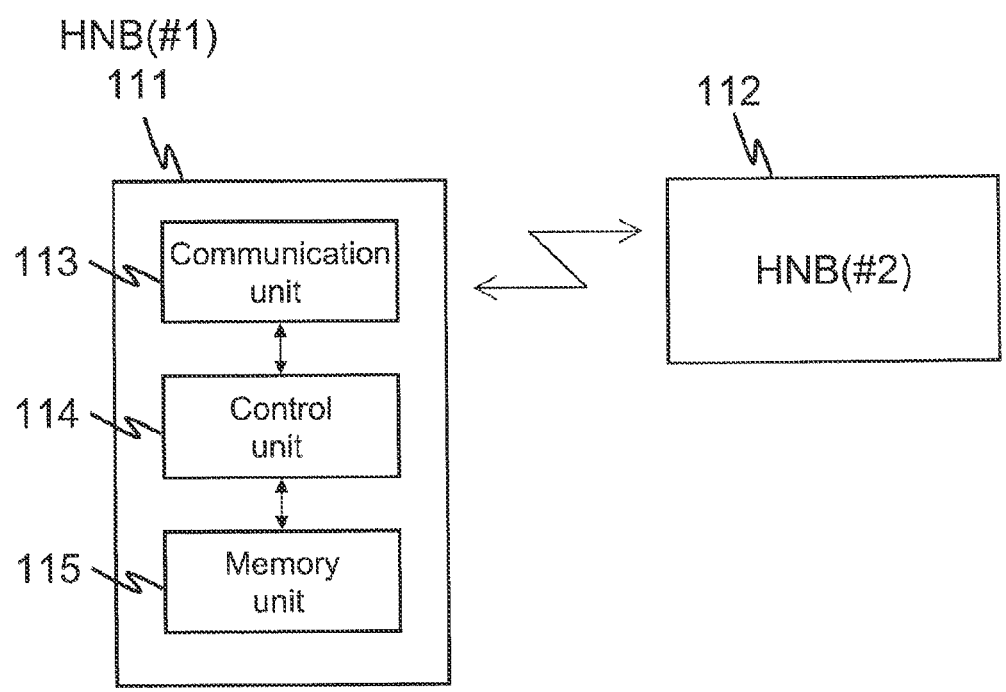
FIG. 3 shows an example of the configuration of the HNB shown in FIG. 2.

Referring to FIG. 3, the configuration of HNB (#1) 111 is shown. HNB (#2) 112 is of a configuration similar to that of HNB (#1) 111.

HNB (#1) 111 includes communication unit 113, control unit 114, and memory unit 115.

Control unit 114 determines the UL scrambling code range that is the range of the UL scrambling codes that are reserved in its own cell (i.e., the range of particular UL scrambling codes that are currently being used or that is can be used in its cell). Control unit 114 then assigns to subordinate UE that carries out communication unused UL scrambling codes within the above-described UL scrambling code range that was determined.

Communication unit 113, when in an operating state, includes the UL scrambling code range that is reserved in its own cell in parameters referred to as the Reserved UL Scrambling Code Range of a System Information message of RRC (Radio Resource Control) protocol and reports within its own cell.

Communication unit 113 further receives System Information messages that are reported by neighboring HNB during execution of a network listening mode.

The network listening mode is an operation that is generally being carried out in which an HNB behaves as UE to learn the radio environment in its vicinity, reads information that is being transmitted from surrounding HNB and Macro NodeB, and optimizes various parameters that are set in its own cell.

Referring to FIG. 4, an example is shown of the setting method in which a Reserved UL Scrambling Code Range is set in a System Information message. According to this example, "maxNumofULScramblingCodeRangeLists" that expresses the maximum number of Reserved UL Scrambling Code Ranges that can be reserved (16 in this example) is prescribed. As a result, a number of UL scrambling code ranges that is equal to or lower than this number is reserved as the "Reserved UL Scrambling Code Range List." In addition, in each range, a "Reserved UL Scrambling Code Range start" that is the start Number of the start position of a UL scrambling code and "Reserved UL Scrambling Code Range Offset" that is an Offset value that represents the number of UL Scrambling Codes from this start Number are prescribed.

Referring to FIG. 5, an actual example of the setting method of the Reserved UL Scrambling Code Range shown in FIG. 4 is shown. In this example, the Reserved UL Scrambling Code Range List is "1," the Reserved UL Scrambling Code Range start is "8192," and the Reserved UL Scrambling Code Range Offset is "4." In other words, in this example, one range is reserved that contains the four UL scrambling codes from 8192 to 8195. The HNB that reports this Reserved UL Scrambling Code Range has the potential to use the four UL scrambling codes from 8192 to 8195, and another HNB that acquires this information must avoid use of these four UL scrambling codes.

The setting method of the Reserved UL Scrambling Code Range shown in FIGS. 4 and 5 is only one example and the present invention is not limited to this example.

Memory unit 115 stores a database that records the Reserved UL Scrambling Code Ranges that are reserved by neighboring HNB and that are contained in System Information messages received from neighboring HNB.

Referring to FIG. 6, an example of a database showing the Reserved UL Scrambling Code Range that is reserved by a neighboring HNB is shown. In this example, "Start" that is the start Number and "Offset" that is the Offset value of a Reserved UL Scrambling Code Range are recorded for each cell of neighboring HNB.

Control unit 114 refers to this database when determining the UL scrambling codes that are to be reserved in its own cell and uses UL scrambling codes that are not recorded in the database as the Reserved UL Scrambling Code Range.

The operations of the mobile communication system of the present exemplary embodiment are next described.

A summary of the overall operations of the mobile communication system of the present exemplary embodiment is first described with reference to FIG. 2. In FIG. 2, HNB (#1) 111 is assumed to be in the operating state.

HNB (#1) 111 operates its own cell while including the UL scrambling codes that are reserved in its own cell (i.e., the Reserved UL Scrambling Codes) in a System Information message and reporting the message.

HNB (#2) 112, by executing the network listening mode, receives the System Information message that is being reported by HNB (#1) 111 and thus obtains the Reserved UL Scrambling Code Range included in the message.

HNB (#2) 112 determines by any method the UL scrambling code range that is to be reserved in its own cell from among the UL scrambling code ranges other than the Reserved UL Scrambling Code Range that is reported by HNB (#1) 111. HNB (#2) 112 then, after the start of operation of its own station, includes the UL scrambling code range that was determined as the Reserved UL Scrambling Code Range in a System Information message and reports the message.

The operations of HNB (#1) 111 and HNB (#2) 112 are next described.

Figure 7:
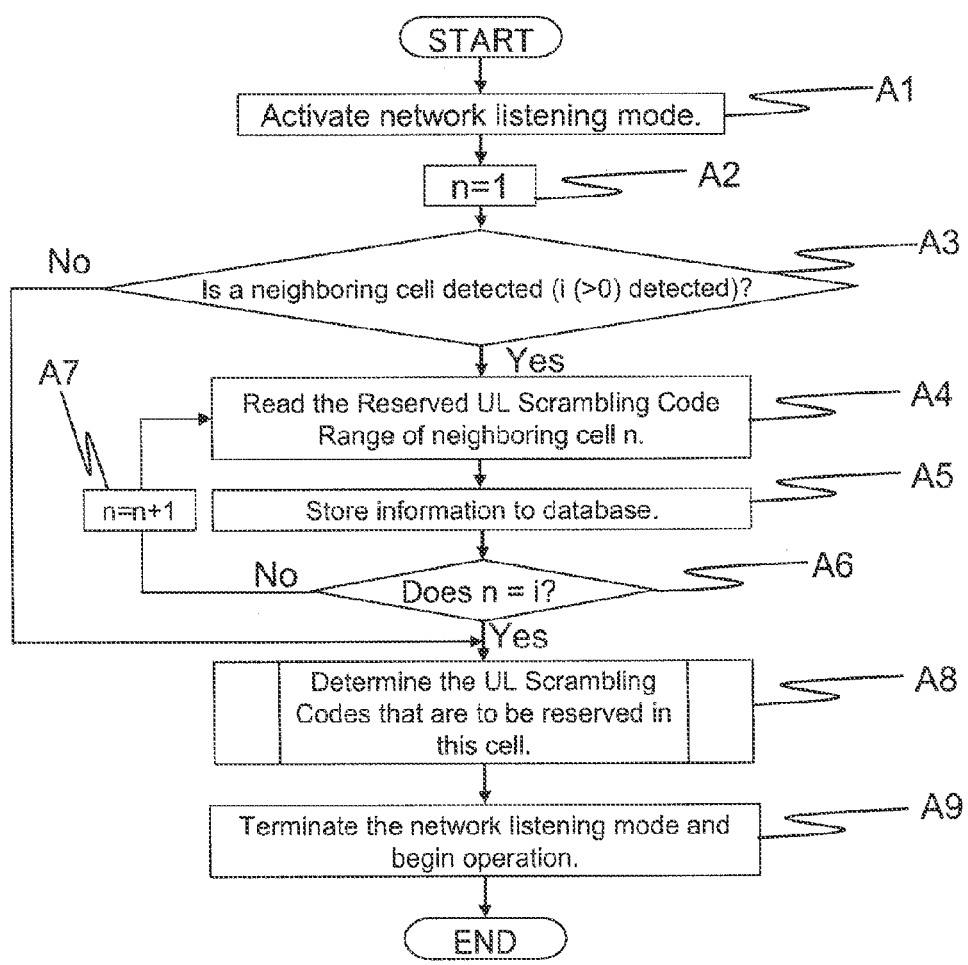
FIG. 7 is a flow chart showing an example of the operations at the time of execution of the network listening mode of the HNB shown in FIG. 2.

Referring to FIG. 7, a flow chart shows a portion of the operations at the time of execution of the network listening mode of HNB (#1) 111 and HNB (#2) 112, i.e., a portion of operations from the activation until the completion of the network listening mode, those operations that relate to the present invention. Explanation here focuses on HNB (#2) 112.

Upon activation of the network listening mode (Step A1), HNB (#2) 112 initializes n to "1" (Step A2) and detects neighboring cells (Step A3).

In Step A3, when a number i (>0) of neighboring cells has been detected, HNB (#2) 112 receives, for the i neighboring cells, the Reserved UL Scrambling Code Ranges that are reported in each cell in order from the first cell until the ith cell (Step A4) and records the Reserved UL Scrambling Code Ranges in a database (Step A5).

When these operations have been repeated up to the ith cell (Steps A6 and A7) and the information of the ith cell has been recorded, HNB (#2) 112 determines the UL scrambling code range that is to be reserved in its own cell such that there is no duplication of the UL scrambling codes that have been recorded as the Reserved UL Scrambling Code Range of each cell (Step A8).

For example, it will be assumed that, as shown in FIG. 6, HNB (#2) 112 recognizes only HNB (#1) 111 as a neighboring cell and only the start Number and Offset value of the Reserved UL Scrambling Code Range that was reported from HNB (#1) 111 are recorded in the database. When determining the UL scrambling codes that are to be reserved in Step A8 in this case, HNB (#2) 112 uses the UL scrambling codes other than the four from 8192 to 8195 that are recorded in the database as the Reserved UL Scrambling Code Range.

On the other hand, when a neighboring cell is not detected in Step A3 (more specifically, if no cells are detected at all, or if only cells having extremely low field strength are detected), HNB (#2) 112 is able to freely determine the UL scrambling code range that is to be reserved in its own cell (Step A8).

When the network listening mode ends and operation begins (Step A9), HNB (#2) 112 includes the UL scrambling codes that are reserved in its own cell in the Reserved UL Scrambling Code Range of a System Information message and reports the message.

The network listening mode of FIG. 7 is executed before the HNB begins operation, but may also be executed when the HNB is in the operating state.

In the present exemplary embodiment as described hereinabove, each HNB reports the UL scrambling codes that are reserved in its own cell and is therefore able to learn the UL scrambling codes that are reserved in neighboring HNBs, whereby duplication of UL scrambling codes among neighboring HNB can be avoided.

Although each HNB includes the UL scrambling code range that is reserved in its own cell in a parameter referred to as the Reserved UL Scrambling Code Range in a System Information message of RRC protocol and reports the message in the present exemplary embodiment, the present invention is not limited to this form, and other messages, parameters, or parameter formats may be employed.

Second Exemplary Embodiment

Figure 8:
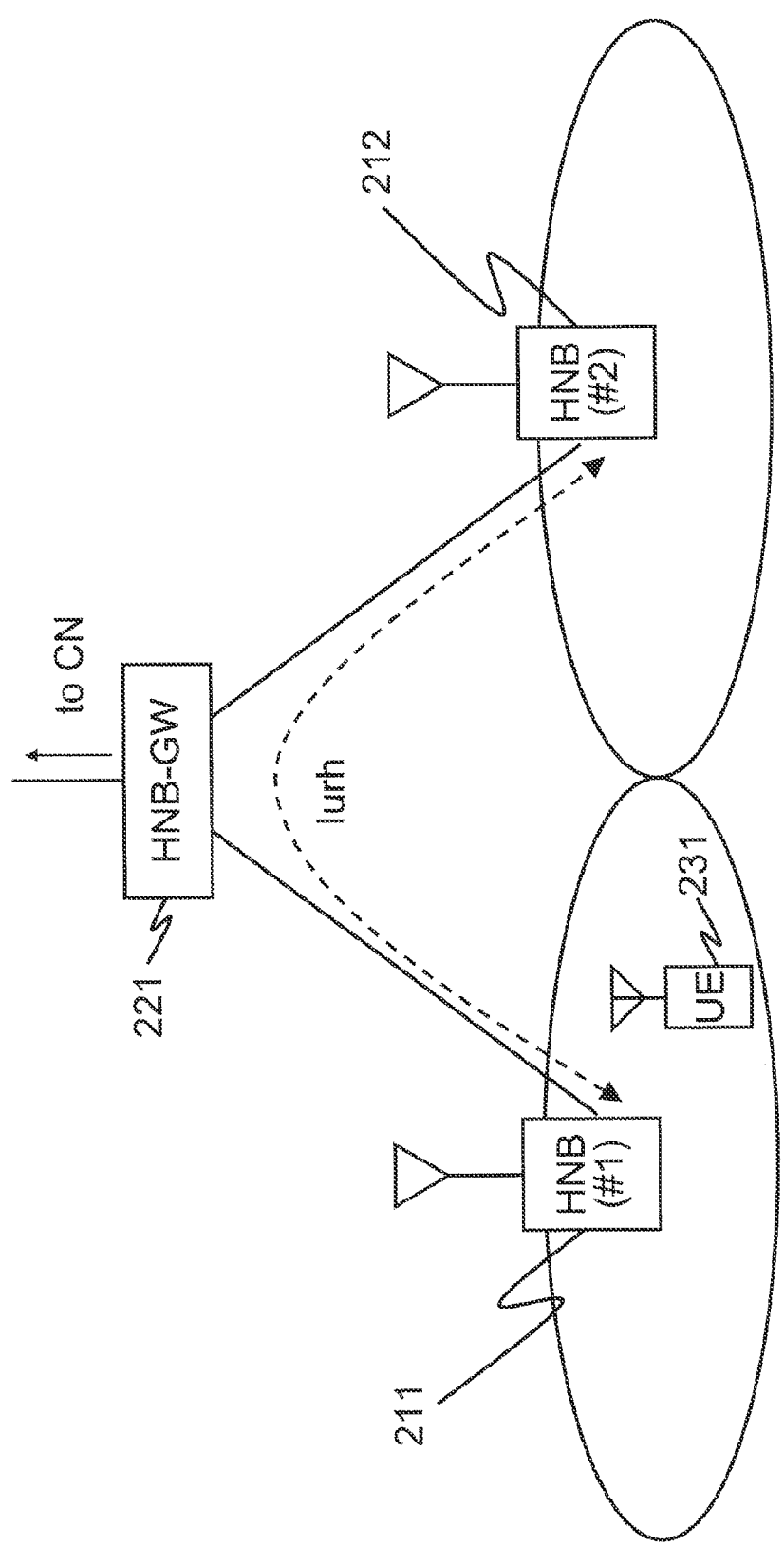
FIG. 8 shows the configuration of the mobile communication system of the second exemplary embodiment of the present invention.

Referring to FIG. 8, the configuration of a portion of the mobile communication system of the present exemplary embodiment is shown.

The mobile communication system of the present exemplary embodiment includes: two HNBs, HNB (#1) 211 and HNB (#2) 212, HNB-GW (Home Node B Gateway) 221 that is the higher-order apparatus, and UE 231 that carries out radio communication with HNB (#1) 211 and HNB (#2) 212.

In the 3GPP standards, a logical interface referred to as Iurh is being investigated as an interface for carrying out communication by means of RNSAP (Radio Network Subsystem Application Part) Signaling between HNBs.

HNB (#1) 211 and HNB (#2) 212 are connected to each other by this interface Iurh by way of HNB-GW 221.

In the present exemplary embodiment, HNB (#1) 211 and HNB (#2) 212 report the UL scrambling code ranges that are reserved in their respective cells by way of interface Iurh.

Figure 9:
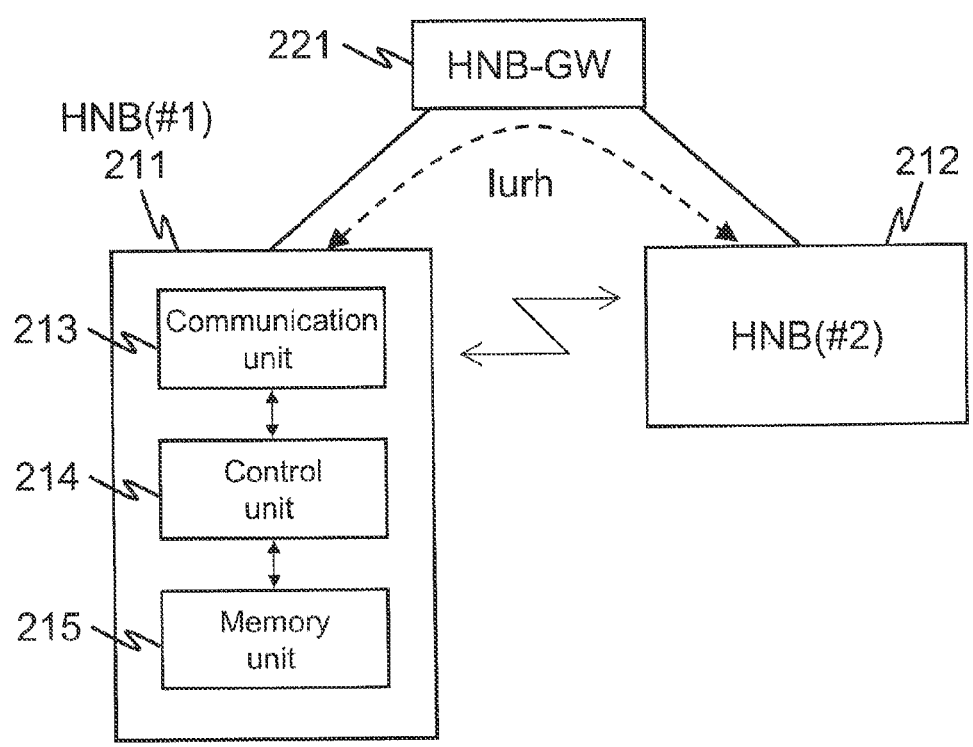
FIG. 9 shows an example of the configuration of the HNB shown in FIG. 8.

Referring to FIG. 9, the configuration of HNB (#1) 211 is shown. HNB (#2) 212 is also of the same configuration as HNB (#1) 211.

HNB (#1) 211 includes communication unit 213, control unit 214, and memory unit 215.

Control unit 214 determines the Reserved UL Scrambling Code Range that is to be reserved in its own cell. Control unit 214 then assigns still unused UL scrambling codes within the UL scrambling code range that was determined as described above to subordinate UE that is carrying out communication.

Upon detection of a neighboring cell by executing the network listening mode at the time of starting operations, communication unit 213 transmits to the HNB of the neighboring cell by way of interface Iurh a Reserved UL Scrambling Code Range Request message that requests the transmission of the Reserved UL Scrambling Code Range that is reserved. There are no particular restrictions on the format of the Reserved UL Scrambling Code Range Request message, as long as the message requests HNBs that have been detected by means of execution of the network listening mode to transmit Reserved UL Scrambling Code Ranges.

In addition, upon having received a Reserved UL Scrambling Code Range Request message while in the operating state, communication unit 213 transmits, by way of interface Iurh to the HNB that is the transmission origin of this Reserved UL Scrambling Code Range Request message, a Reserved UL Scrambling Code Range Response message that is a response message to the Reserved UL Scrambling Code Range Request message and that contains the Reserved UL Scrambling Code Range that is reserved in its own cell.

Referring to FIG. 10, an example is shown of the setting method by which the Reserved UL Scrambling Code Range is set in a Reserved UL Scrambling Code Range Response message. According to this example, similar to FIG. 4, a "maxNumofULScramblingCodeRangeLists" is prescribed that shows the maximum number of Reserved UL Scrambling Code Ranges that can be reserved (in this example, 16). As a result, a number of UL scrambling code ranges that is no greater than this maximum are reserved as the "Reserved UL Scrambling Code Range List." In addition, similar to FIG. 4, a "Reserved UL Scrambling Code Range start" that is the start Number of the starting position of the UL scrambling codes and a "Reserved UL Scrambling Code Range Offset" that if an Offset value that shows how many UL scrambling codes are reserved from that point are prescribed in each Range.

The setting method of the Reserved UL Scrambling Code Range that is shown in FIG. 10 is only an example, and the present invention is not limited to this form.

Memory unit 215 stores a database that shows the Reserved UL Scrambling Code Ranges that are reserved in the neighboring HNB that are contained in Reserved UL Scrambling Code Range Response messages received from neighboring HNB. The content of this database is similar to FIG. 6.

Control unit 214 refers to this database for each determination of UL scrambling codes that are to be reserved in its own cell and uses UL scrambling codes that are not recorded in the database as the Reserved UL Scrambling Code Range.

Figure 11:
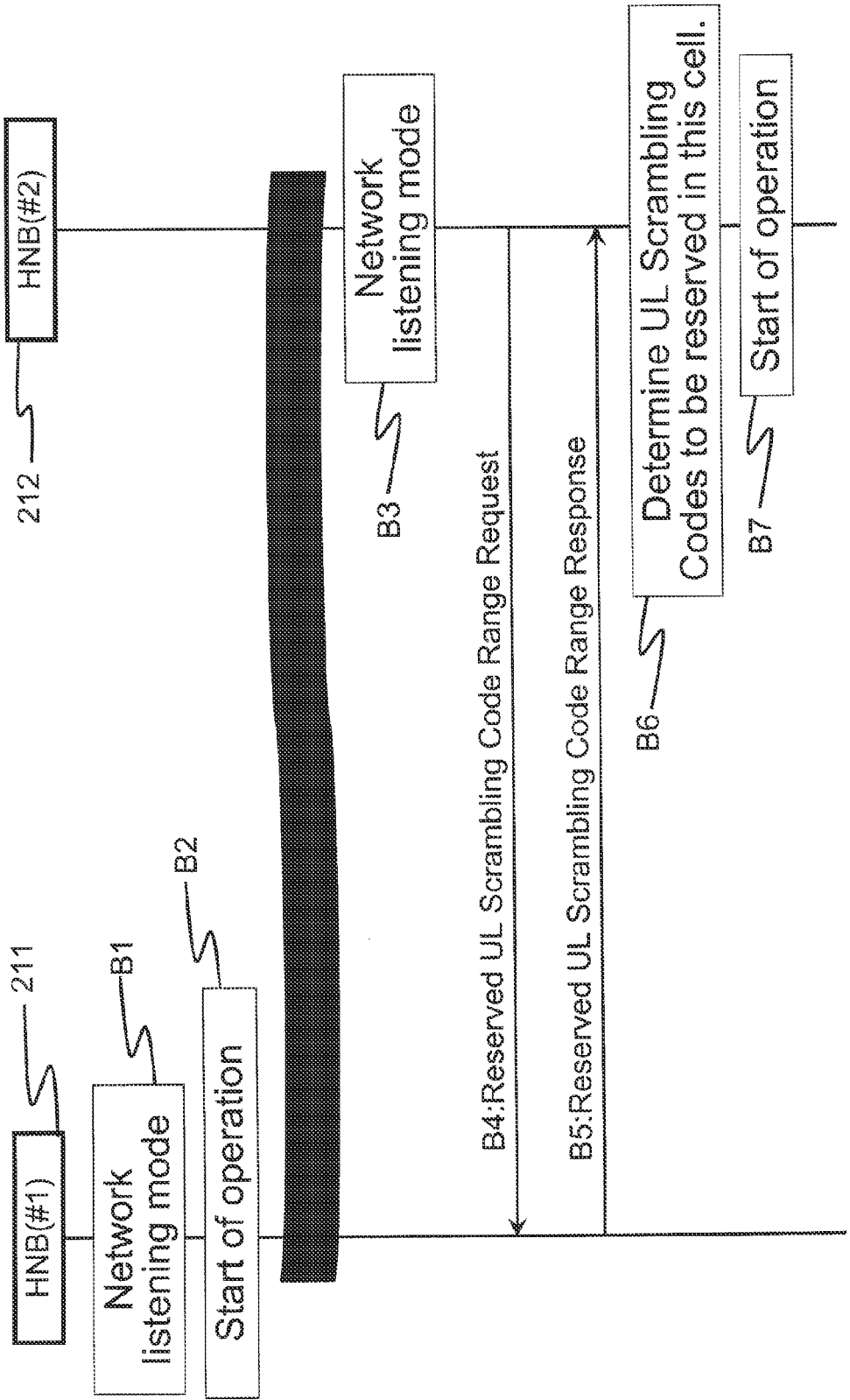
FIG. 11 is a sequence chart showing an example of the operations of the mobile communication system shown in FIG. 8.

The operations of the mobile communication system of the present exemplary embodiment are next described with reference to the sequence chart of FIG. 11. In FIG. 11, HNB (#1) 211 is assumed to begin operations before HNB (#2) 212.

Upon introduction of power, HNB (#1) 211 executes the network listening mode (Step B1) and detects neighboring cells. In this case, neighboring cells are not detected, and HNB (#1) 211 therefore reserves any Reserved UL Scrambling Code Range and begins operation (Step B2).

HNB (#1) 211 subsequently assigns still unused UL scrambling codes within the Reserved UL Scrambling Code Range to subordinate UE that carries out communication.

HNB (#2) 212 next, upon introduction of power, executes the network listening mode similar to HNB (#1) 211 (Step B3) and detects neighboring cells. In this case, the cell of HNB (#1) 211 is detected as a neighboring cell, whereby HNB (#2) 212 subsequently exchanges RNSAP messages with HNB (#1) 211 by way of interface Iurh.

HNB (#2) 212 first transmits a Reserved UL Scrambling Code Range Request message to HNB (#1) 211 to learn the Reserved UL Scrambling Code Range of HNB (#1) 211 (Step B4).

Upon receiving the Reserved UL Scrambling Code Range Request message, HNB (#1) 211 transmits a Reserved UL Scrambling Code Range Response message to HNB (#2) 212 that is the transmission origin of the Reserved UL Scrambling Code Range Request message (Step B5).

Upon receiving the Reserved UL Scrambling Code Range Response message, HNB (#2) 212 determines UL scrambling codes that are not reserved in HNB (#1) 211 as the UL scrambling codes that are to be reserved in its own cell (Step B6) and then begins operation (Step B7).

In the present exemplary embodiment as described hereinabove, each HNB reports the reserved UL scrambling codes to neighboring HNB by way of HNB-GW and can thus learn the UL scrambling codes that are reserved in neighboring HNB, whereby duplication of UL scrambling codes among neighboring HNB can be avoided.

Although each HNB includes the UL scrambling code range that is reserved in its own cell in a parameter referred to as the Reserved UL Scrambling Code Range in a RNSAP Reserved UL Scrambling Code Range Request/Response messages in the present exemplary embodiment, the present invention is not limited to this form, and other messages, parameters, or parameter formats may be used.

Third Exemplary Embodiment

Figure 12:
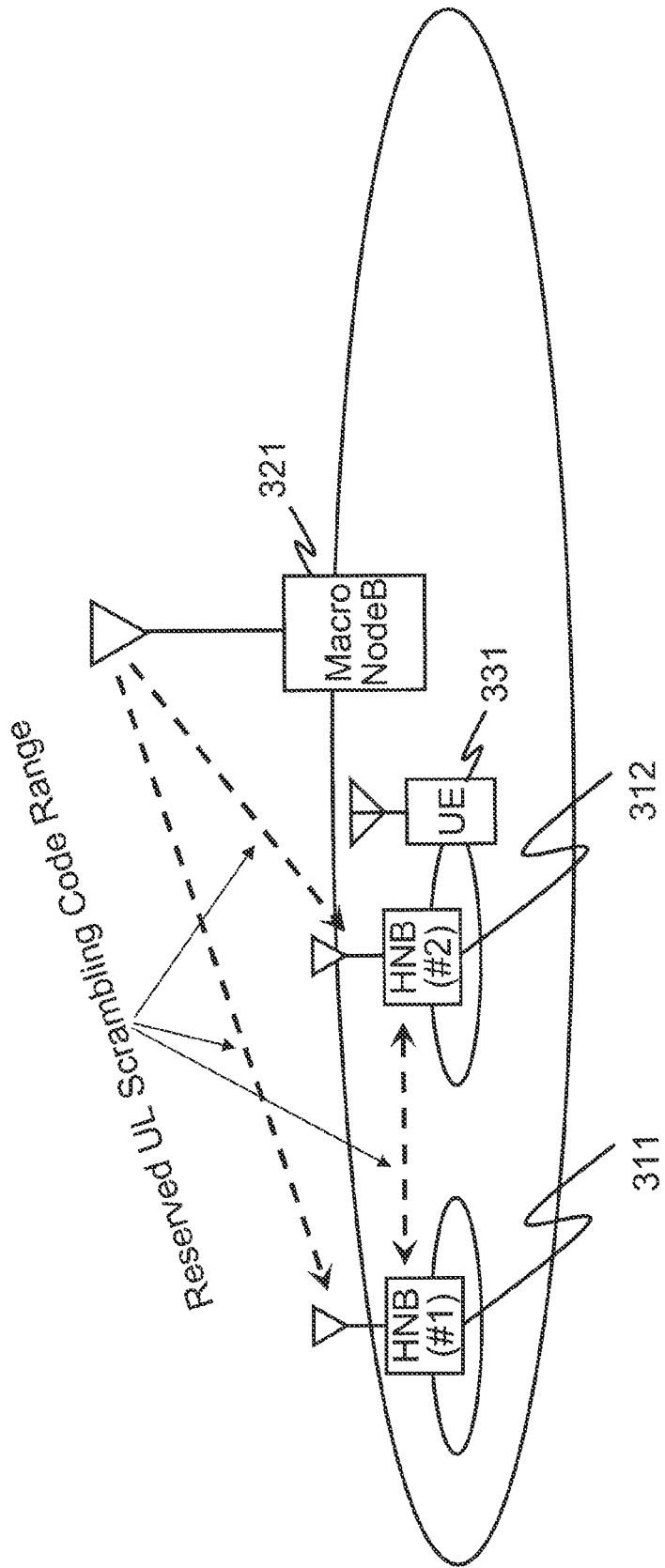
FIG. 12 shows the configuration of the mobile communication system of the third exemplary embodiment of the present invention.

Referring to FIG. 12, the configuration of a portion of the mobile communication system of the present exemplary embodiment is shown.

The mobile communication system of the present exemplary embodiment includes: two HNB: HNB (#1) 311 and HNB (#2) 312; Macro NodeB 321, and UE 331 that carries out radio communication with HNB (#1) 311, HNB (#2) 312, and Macro NodeB 321.

In the present exemplary embodiment, not only HNB (#1) 311 and HNB (#2) 312, but also Macro NodeB 321 include the UL scrambling code ranges that are reserved in their own cells in System Information messages of RRC protocol and report the message.

Figure 13:
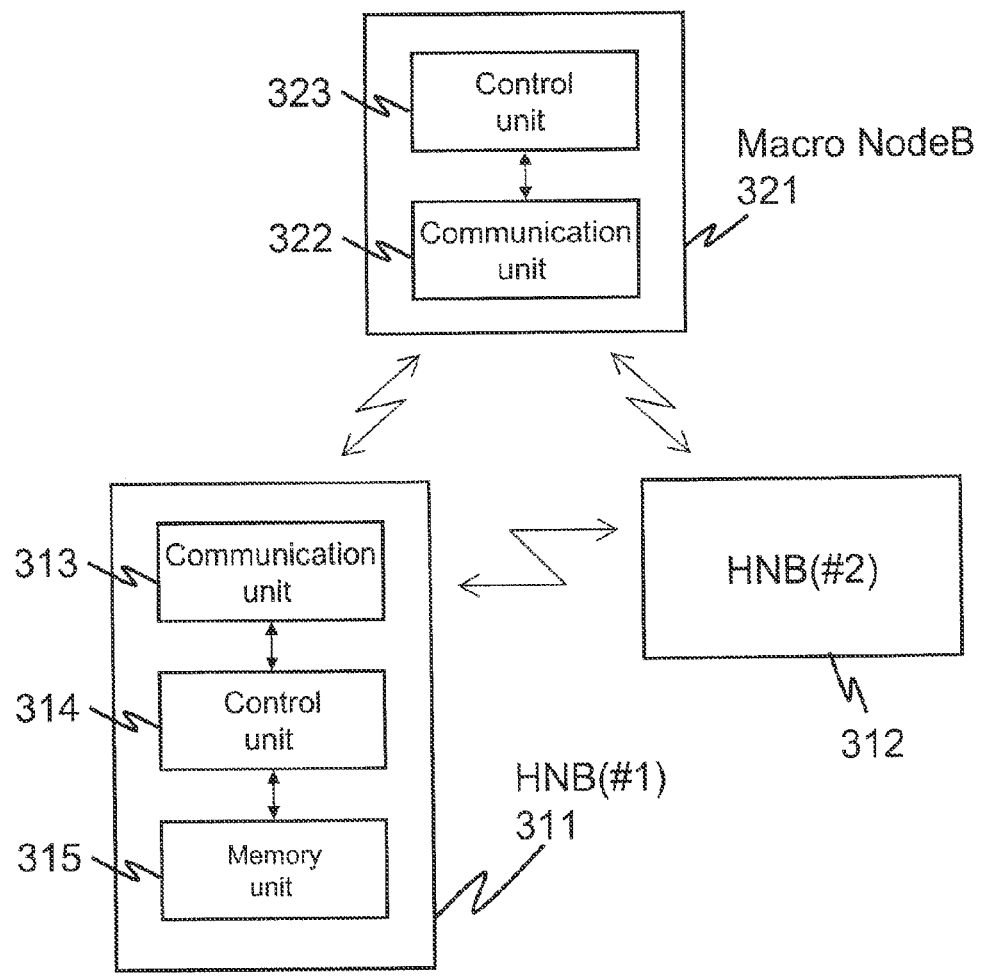
FIG. 13 shows an example of the configuration of the HNB and Macro NodeB shown in FIG. 12.

Referring to FIG. 13, the configurations of HNB (#1) 311 and Macro NodeB 321 are shown. HNB (#2) 312 is also of the same configuration as HNB (#1) 311.

HNB (#1) 311 includes communication unit 313, control unit 314, and memory unit 315.

Control unit 314 determines the UL scrambling code range that is to be reserved in its own cell similar to control unit 114 shown in FIG. 3. Control unit 314 then assigns still unused UL scrambling codes among the UL scrambling code range that was determined to subordinate UE that carries out communication.

The operation of communication unit 313 is identical to the operation of communication unit 113 shown in FIG. 3 with the exception that, during execution of the network listening mode, communication unit 313 receives System Information messages that are reported by not only neighboring HNB, but also by neighboring Macro NodeB.

The operation of memory unit 315 is identical to the operation of memory unit 115 shown in FIG. 3, with the exception that memory unit 315 stores a database that records the Reserved UL Scrambling Code Ranges that are reserved not only by neighboring HNB but also by neighboring Macro NodeB.

Control unit 314, when determining the UL scrambling code range that is to be reserved in its own cell, refers to this database and uses UL scrambling codes that are not recorded in the database as the Reserved UL Scrambling Code Range.

Macro NodeB 321 includes communication unit 322 and control unit 323.

In the case of Macro NodeB 321, in contrast to HNB (#1) 311 and HNB (#2) 312, a Reserved UL Scrambling Code Range is set beforehand by means of an RNC (not shown in the figure).

As a result, Macro NodeB 321 does not require a memory unit for storing a database for recording the Reserved UL Scrambling Code Ranges that are reserved by neighboring HNB or Macro NodeB.

Control unit 323 assigns still unused UL scrambling codes within the UL scrambling code range that was set beforehand by an RNC to subordinate UE that carries out communication.

Similar to communication unit 113 shown in FIG. 3, communication unit 322 when in the operating state includes the UL scrambling code range that is reserved in its own cell in a parameter referred to as the Reserved UL Scrambling Code Range of a System Information message of RRC Protocol and reports the message.

Communication unit 322 does not absolutely need to acquire System Information messages that are reported by neighboring HNB through the execution of the network listening mode as with communication unit 113 shown in FIG. 3.

The operations of the mobile communication system of the present exemplary embodiment are next described. It is here assumed that HNB (#1) 311 and Macro NodeB 321 are in the operating state.

HNB (#1) 311 operates its own cell while including the Reserved UL Scrambling Code of its own cell in a System Information message and reporting the message.

Similarly, Macro NodeB 321 also operates its own cell while including the Reserved UL Scrambling Codes of its own cell in a System Information message and reporting the message.

HNB (#2) 312 receives the System Information messages that are reported by HNB (#1) 311 and Macro NodeB 321 through the network listening mode and thus acquires the Reserved UL Scrambling Code Ranges that are contained in these messages.

HNB (#2) 312 then determines by any method the UL scrambling code range that is to be reserved in its own cell from among UL scrambling code ranges other than the Reserved UL Scrambling Code Ranges that are reported by HNB (#1) 311 and Macro NodeB 321. HNB (#2) 312 then, after operation of its own cell begins, includes the UL scrambling code range that was determined as the Reserved UL Scrambling Code Range in a System Information message and reports the Reserved UL Scrambling Code Range.

In the present exemplary embodiment as described hereinabove, not only HNB but also Macro NodeB reports in its own cell the UL Scrambling Codes that are reserved.

As a result, each HNB is able to learn the UL Scrambling Codes that are reserved in neighboring HNB and Macro NodeB, whereby duplication of UL Scrambling Codes can be avoided among not only neighboring HNBs but also among neighboring Macro NodeBs.

Fourth Exemplary Embodiment

Figure 14:
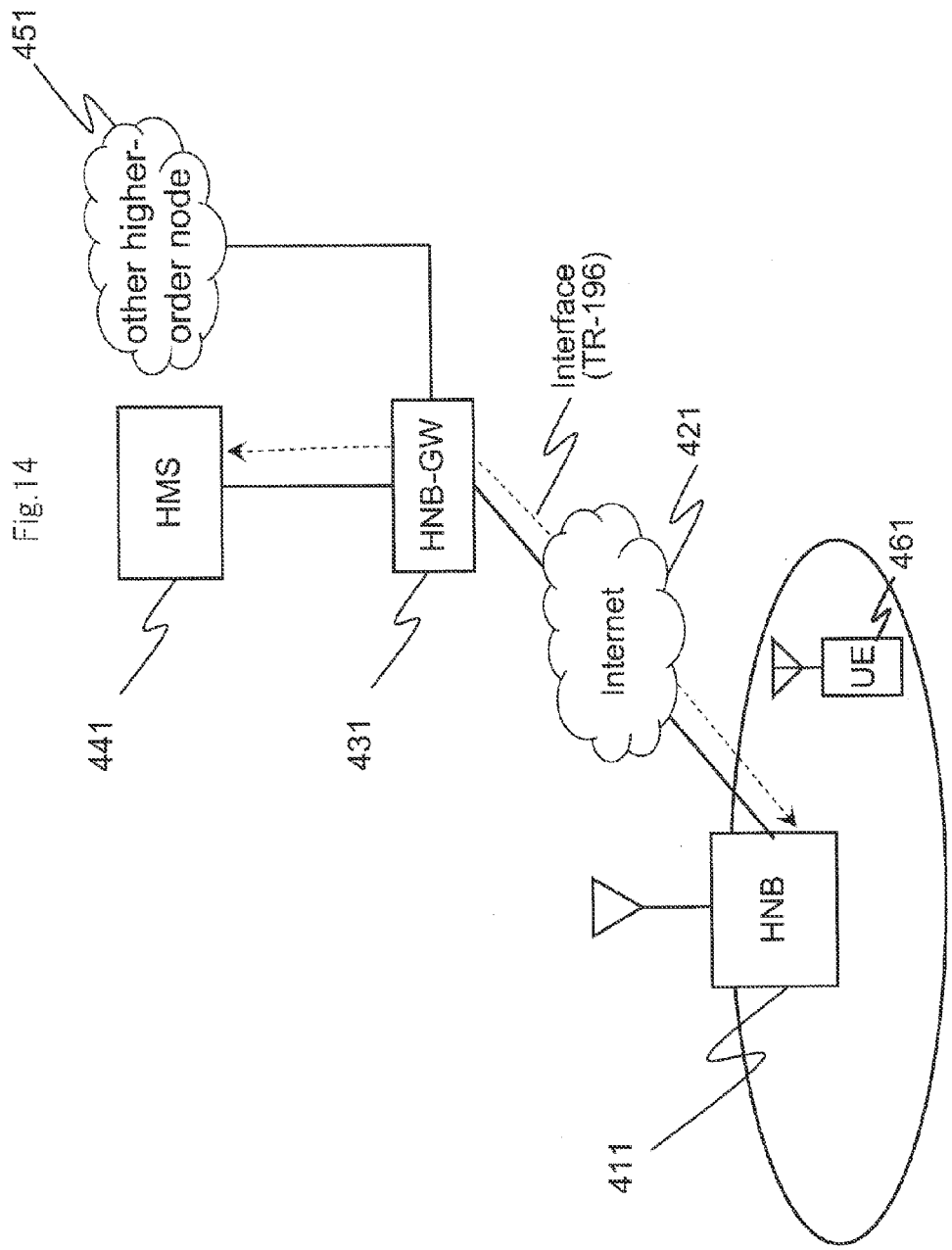
FIG. 14 shows the configuration of the mobile communication system of the fourth exemplary embodiment of the present invention.

Referring to FIG. 14, the configuration of a portion of the mobile communication system of the present exemplary embodiment is shown.

The mobile communication system of the present exemplary embodiment includes HNB 411, HNB-GW 431, HMS (Home NodeB Management System) 441 that serves as a higher-order apparatus, other higher-order Node 451 that is a Core Network Apparatus such as an SGSN (Serving GPRS (General Packet Radio Service) Support Node) or MSC (Mobile Switching Center), and UE 461 that carries out radio communication with HNB 411.

HNB 411 is connected to HNB-GW 431 by way of Internet 421. HNB-GW 431 is connected to HMS 441 and other higher-order Node 451.

The configuration of FIG. 14 is a typical configuration of an HNB network.

Specifications referred to as TR (Technical Report)-069, TR-098, and TR-196 have been established in the Broadband Forum.

TR-069 is a specification that defines the interface concept between a management server (corresponding to HMS 441 of FIG. 14) and network equipment (corresponding to HNB 411 of FIG. 14) that is managed by the management server.

TR-098 is a specification that defines the configuration of a Data Model that network equipment should have. A Data Model is a set of objects, and parameters that are necessary for operating the network are defined in each of the objects. The transmission of information is enabled by the reading and writing of these parameters by a management server and network equipment.

TR-196 defines a Data Model that is specialized for HNB, the format of this Data Model being of a structure established by TR-098 and corresponding to a portion of the objects of TR-098.

Although the use of these TR between an HNB and an HMS is prescribed in the 3GPP standards, there are no parameters that relate to current UL scrambling codes in TR-196. As a result, the UL scrambling codes that are to be used in an HNB cannot be communicated from an HMS to the HNB.

In response, in the present exemplary embodiment, the UL scrambling code range that is used by HNB 411 is newly defined in the interface between HNB 411 and HNB-GW 431 that is prescribed in TR-196, and HMS 441 determines this UL scrambling code range and communicates the range to HNB 411.

Figure 15:
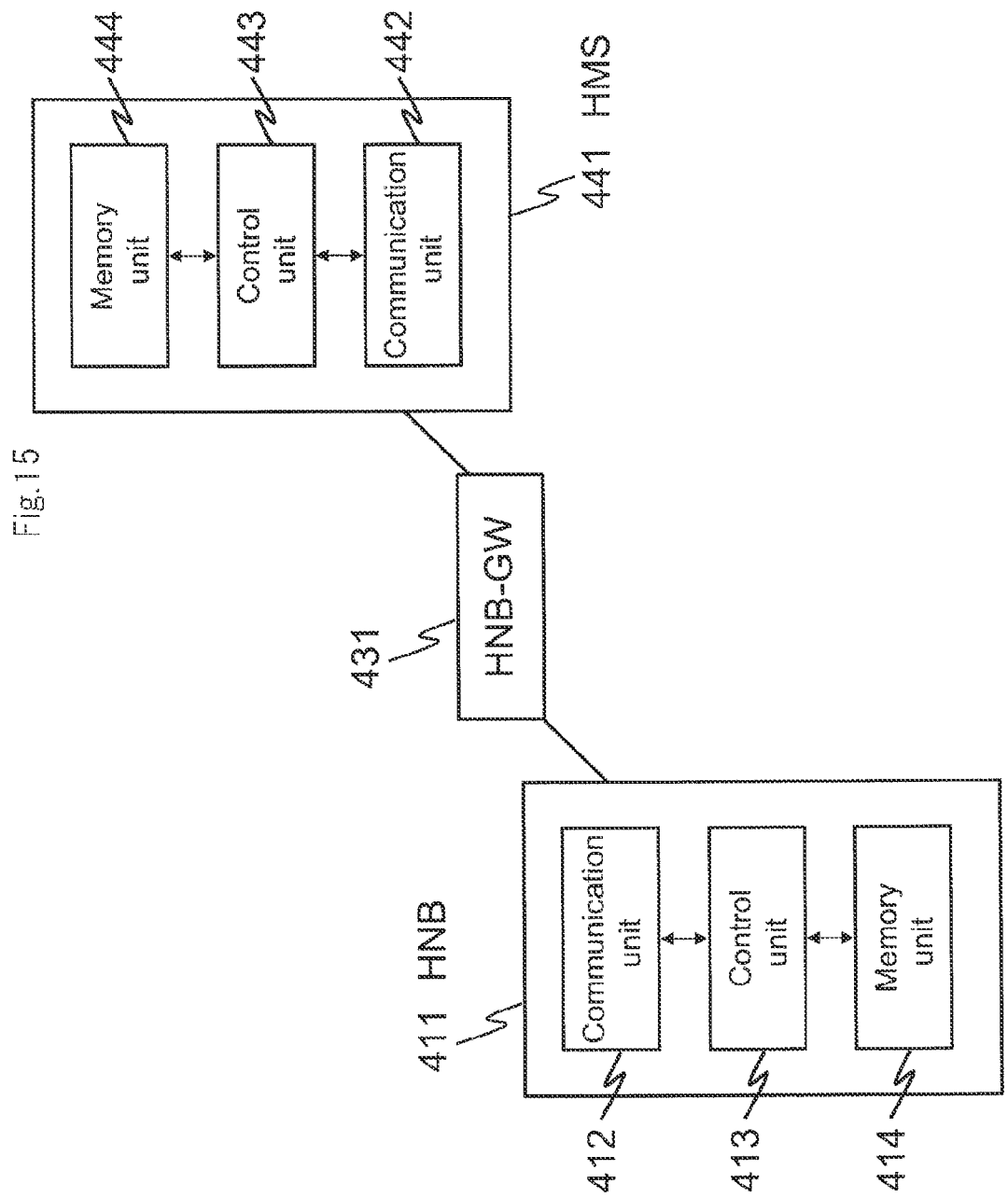
FIG. 15 shows an example of the configuration of HNB and HMS shown in FIG. 14.

Referring to FIG. 15, the configurations of HNB 411 and HMS 441 are shown.

HMS 441 includes communication unit 442, control unit 443, and memory unit 444.

Control unit 443 determines the UL scrambling code range that is assigned to subordinate HNB 411.

Memory unit 444 stores a database (second database) in which are recorded the UL scrambling code ranges that have been assigned to subordinate HNB.

Referring to FIG. 16, an example is shown of a database in which the UL scrambling code ranges that have been assigned to subordinate HNB are recorded. In this example, "Start" that is the start Number of the UL scrambling code range and "Offset" that is the Offset value are recorded for each HNB Identity that is unique to a subordinate HNB.

Control unit 443, with each determination of a UL scrambling code range that is to be assigned to a subordinate HNB, refers to this database and assigns a UL Scrambling Code that has not been recorded in the database.

However, the UL scrambling codes that are assigned to a subordinate HNB will be sufficient if they are of a maximum number of UL Scrambling Codes that can be assigned to the HNB that requests assignment, and the assignment of a number of UL Scrambling Codes that exceeds this number serves no purpose.

As shown in FIG. 17, memory unit 444 further stores a database (first database) that records, for each Hardware Version that shows the type of HNB Hardware, the maximum number of assignable UL Scrambling Codes that an HNB of that Hardware Version requests.

When determining the UL scrambling code ranges that are to be assigned to subordinate HNB, control unit 443 also refers to this database and assigns the maximum number of UL Scrambling Codes that can be assigned that are requested by the Hardware of the subordinate HNB. Control unit 443 can learn the Hardware Version from the InternetGatewayDevice.DeviceInfo.HardwareVersion of Data Model (TR-098).

Communication unit 442 accesses subordinate HNB and writes the UL scrambling code ranges that are assigned to the HNB to the Data Model of the HNB.

Referring to FIG. 18, an example of the setting method of setting UL scrambling code ranges to the Data Model is shown. According to this example, ".FAPService.{i }.CellConfig.UMTS.RAN.FDDFAP.RF. ULScramblingCodeRange.{i }" is prescribed as the identification number of the object. In addition, ".FAPService.{i}.FAPControl.UMTS.SelfConfig. ULScramblingCodeRange.{i}. start" that is the start Number of the start position of the UL Scrambling Code is prescribed as a parameter similar to FIG. 4 and ".FAPService.{i}.FAPControl.UMTS.SelfConfig. ULScramblingCodeRange.{i}.offset" that is an Offset value that shows how many UL scrambling codes are reserved from this position is prescribed.

HNB 411 includes communication unit 412, control unit 413, and memory unit 414.

Memory unit 414 stores the Data Model of HNB 411. HMS 441 accesses this Data Model by way of communication unit 412.

Control unit 413 carries out reading and writing of various types of information that have been written in the Data Model. In the present exemplary embodiment, the UL scrambling code range of its own cell is written in the Data Model, and control unit 413 therefore reads the UL scrambling code range and assigns UL scrambling codes that are still unused among the UL scrambling code range to subordinate UE that carries out communication.

Figure 19:
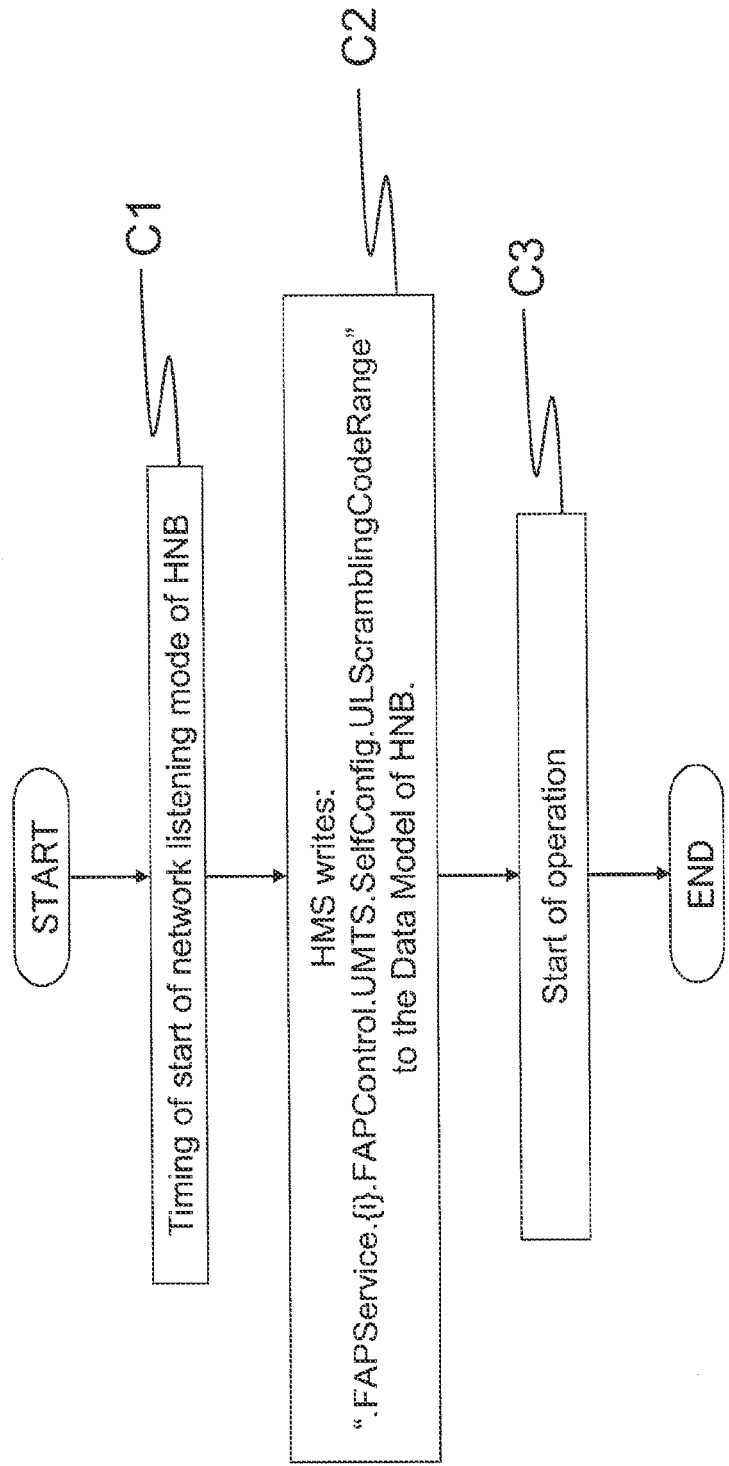
FIG. 19 is a flow chart showing an example of the operations of the mobile communication system shown in FIG. 14.

The operations of the mobile communication system of the present exemplary embodiment are next described with reference to FIG. 19.

Upon arrival of the timing at which HNB 411 begins execution of the network listening mode (for example, upon introduction of power) (Step C1), HMS 441 accesses HNB 411, writes various parameters to the Data Model of HNB 411, and reads from the Data Model (Step C2).

At this time, HMS 441 determines the UL scrambling code range that is assigned to HNB 411 and writes the UL scrambling code range that was determined as shown in FIG. 18.

HNB 411 subsequently starts operation (Step C3) and uses the UL scrambling code range that was assigned from HMS 441.

In the present exemplary embodiment as described hereinabove, HMS assigns the UL scrambling codes that can be used to subordinate HNB, and the duplication of UL Scrambling Codes among an HNB and a neighboring HNB can therefore be avoided.

Fifth Exemplary Embodiment

Figure 20:
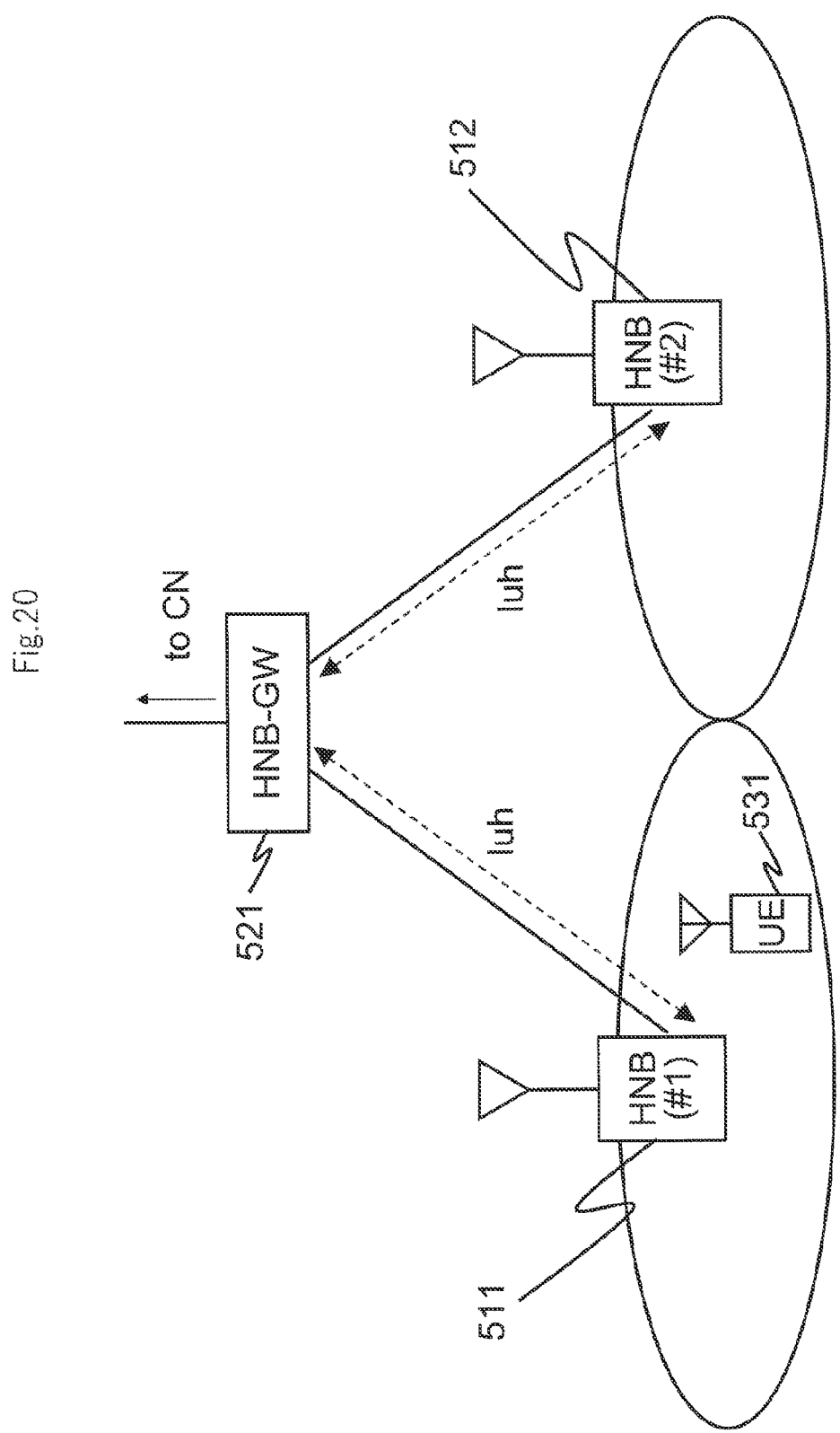
FIG. 20 shows the configuration of the mobile communication system of the fifth exemplary embodiment of the present invention.

Referring to FIG. 20, the configuration of a portion of the mobile communication system of the present exemplary embodiment is shown.

The mobile communication system of the present exemplary embodiment includes: two HNBs, HNB (#1) 511 and HNB (#2) 512; HNB-GW 521 that serves as the higher-order apparatus; and UE 531 that carries out radio communication with HNB (#1) 511 and HNB (#2) 512.

In the 3GPP standards, a logical interface referred to as Iuh is being investigated as an interface for carrying out communication by means of signaling referred to as HNBAP (Home NodeB Application Part) between HNB-GW and each HNB (3GPP TS25.469).

In the present exemplary embodiment, at the time of executing UE Registration to register UE, HNB-GW 521 assigns, to a subordinate HNB that has received a registration request from UE, UL scrambling codes to be used by the UE and uses this interface Iuh to report the assigned UL scrambling code.

Figure 21:
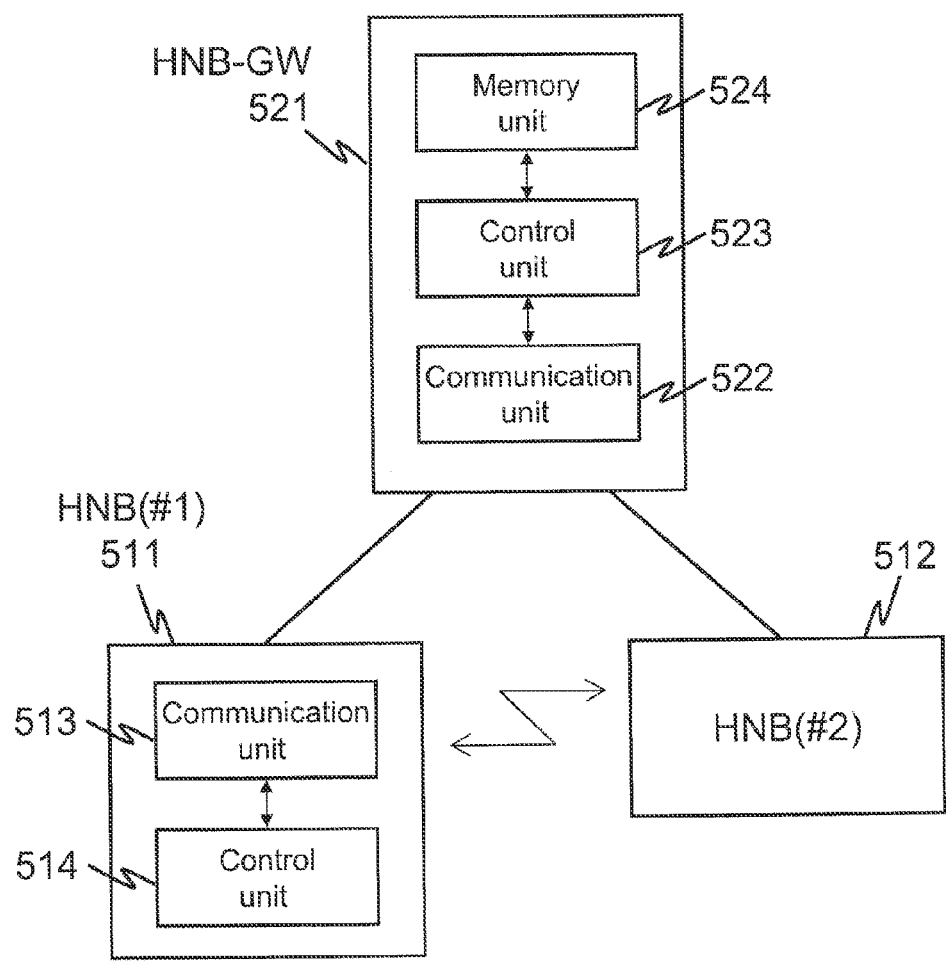
FIG. 21 shows an example of the configuration of the HNB and HNB-GW shown in FIG. 20.

Referring to FIG. 21, the configurations of HNB (#1) 511 and HNB-GW 521 are shown.

HNB-GW 521 includes communication unit 522, control unit 523, and memory unit 524.

Upon receiving a UE REGISTER REQUEST message requesting register of the UE from a subordinate HNB, control unit 523 determines the UL scrambling codes to be assigned to the HNB that is the transmission origin of the UE REGISTER REQUEST message.

Memory unit 524 stores a database in which are recorded UL scrambling codes that have been assigned to subordinate HNB. This database may further record, for example, for each subordinate HNB the UL scrambling codes that have been assigned to that HNB as the UL scrambling code range, similar to the database shown in FIG. 16.

Control unit 523, when determining the UL scrambling codes that are to be assigned to subordinate HNB, refers to this database and assigns UL scrambling codes that have not been recorded in the database.

Upon receiving a UE REGISTER REQUEST message from a subordinate HNB, communication unit 522 transmits, by way of interface Iuh to the HNB that is the transmission origin of the UE REGISTER REQUEST message, a UE REGISTER ACCEPT message that is a response message to the UE REGISTER REQUEST message and that includes UL scrambling codes that are assigned to that HNB.

Referring to FIG. 22, an example of the setting method of setting UL scrambling codes in a UE REGISTER ACCEPT message is shown. According to this example, a "UL Scrambling Code number" that shows the UL scrambling codes that are assigned to the HNB is prescribed.

HNB (#1) 511 includes communication unit 513 and control unit 514. In addition, HNB (#2) 512 is of the same configuration as HNB (#1) 511.

Communication unit 513 both transmits a UE REGISTER REQUEST message to HNB-GW 521 and receives a UE REGISTER ACCEPT message from HNB-GW 521.

Control unit 514, upon receiving the UE REGISTER ACCEPT message from HNB-GW 521, assigns the UL scrambling codes that are contained in the UE REGISTER ACCEPT message to the UE that issued a request for registration.

Figure 23:
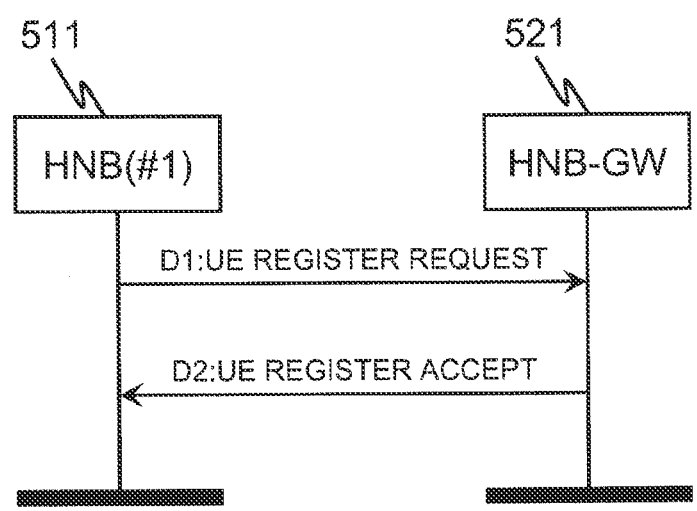
FIG. 23 is a sequence chart showing an example of the operations of the mobile communication system shown in FIG. 20.

The operations of the mobile communication system of the present exemplary embodiment are next described with reference to FIG. 23. It is here assumed that UE has requested registration by way of HNB (#1) 511.

HNB (#1) 511, upon receiving a registration request from a UE, transmits a UE REGISTER REQUEST message to HNB-GW 521 (Step D1).

Upon receiving the UE REGISTER REQUEST message from HNB (#1) 511, HNB-GW 521 selects still unused UL scrambling codes that have not been assigned to a subordinate HNB at that point in time and transmits a UE REGISTER ACCEPT message that contains the selected UL scrambling codes to HNB (#1) 511 (Step D2).

HNB (#1) 511 assigns the UL scrambling codes that are contained in the UE REGISTER ACCEPT message that was received from HNB-GW 521 to the UE that issued the request for registration.

In the present exemplary embodiment as described hereinabove, at the time of executing a UE Registration, HNB-GW assigns UL scrambling codes that are to be used by the UE to a subordinate HNB, whereby duplication of UL scrambling codes by an HNB with a neighboring HNB can be avoided.

Sixth Exemplary Embodiment

Figure 24:
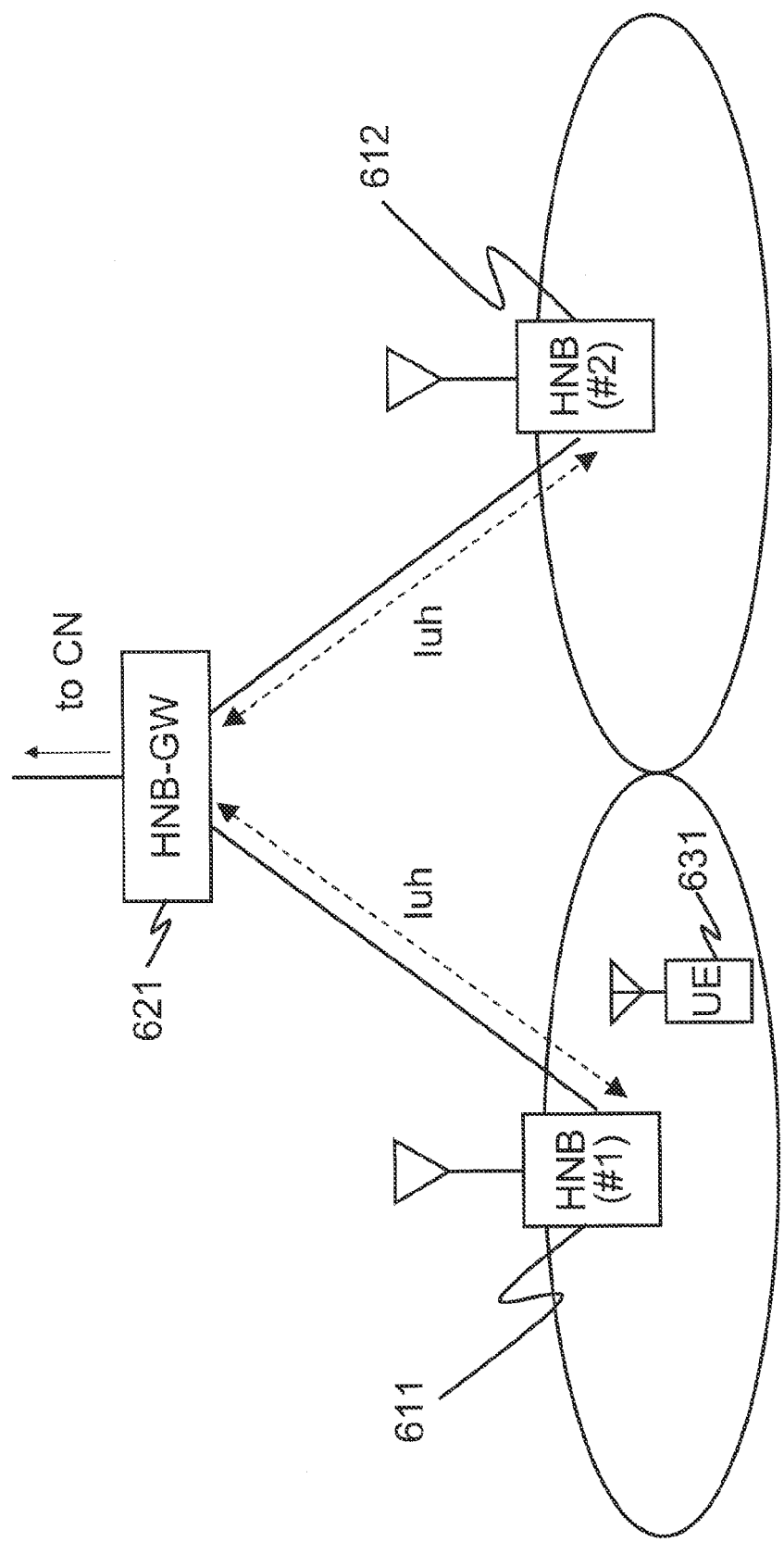
FIG. 24 shows the configuration of the mobile communication system of the sixth exemplary embodiment of the present invention.

Referring to FIG. 24, the configuration of a portion of the mobile communication system of the present exemplary embodiment is shown.

The mobile communication system of the present exemplary embodiment includes: two HNBs, HNB (#1) 611 and HNB (#2) 612; HNB-GW 621 that serves as the higher-order apparatus; and UE 631 that carries out radio communication with HNB (#1) 611 and HNB (#2) 612.

In the present exemplary embodiment, at the time of execution of HNB Registration for registering a subordinate HNB, HNB-GW 621 assigns to the subordinate HNB a UL scrambling code range that can be used in that HNB, and similar to the fifth exemplary embodiment, uses interface Iuh to communicate the assigned UL scrambling code range.

Figure 25:
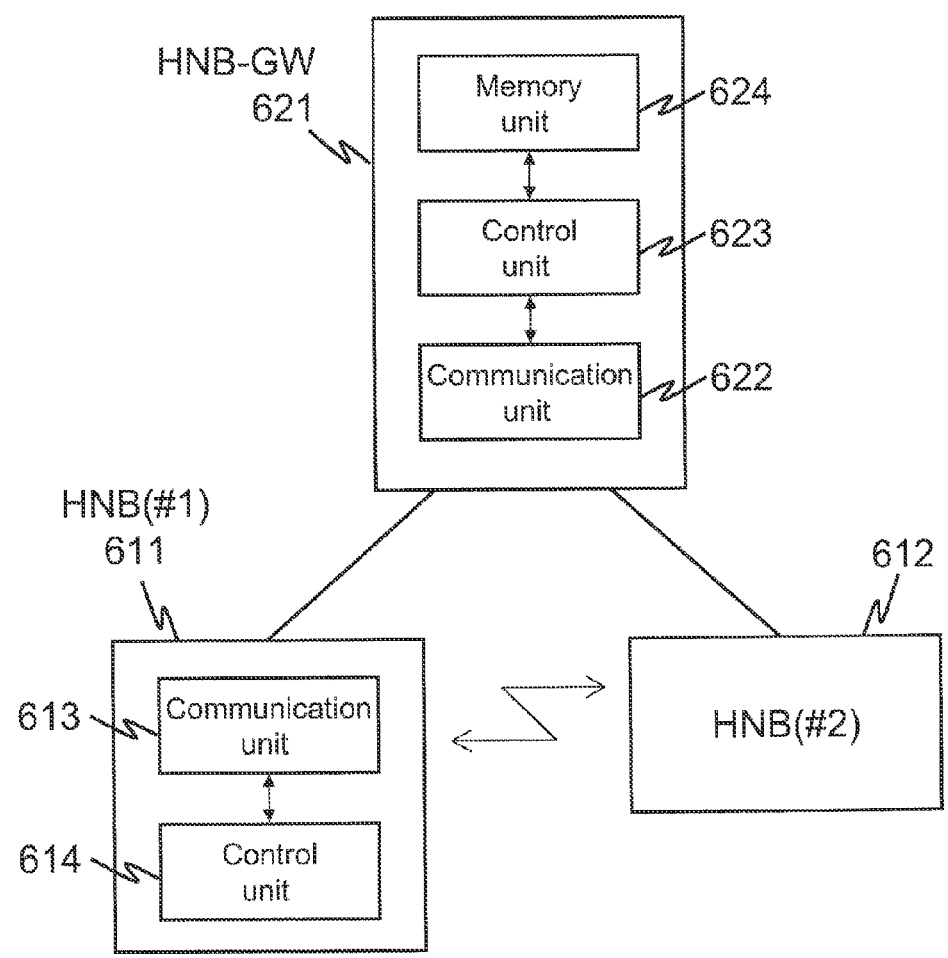
FIG. 25 shows an example of the configuration of HNB and HNB-GW shown in FIG. 24.

Referring to FIG. 25, the configurations of HNB (#1) 611 and HNB-GW 621 are shown. In addition, HNB (#2) 612 is also of the same configuration as HNB (#1) 611.

HNB-GW 621 includes communication unit 622, control unit 623, and memory unit 624.

Control unit 623, upon receiving an HNB REGISTER REQUEST message requesting registration of an HNB from a subordinate HNB, determines the UL scrambling code range that is to be assigned to the HNB that is the transmission origin of the HNB REGISTER REQUEST message.

Memory unit 624 stores a database in which are recorded UL scrambling code ranges that are assigned to subordinate HNB. This database records, for each subordinate HNB, the UL scrambling code range that was assigned to that HNB, similar to the database shown in FIG. 16.

When determining the UL scrambling code range that is to be assigned to a subordinate HNB, control unit 623 refers to this database and assigns a UL scrambling code range that is not recorded in the database.

Upon receiving an HNB REGISTER REQUEST message from a subordinate HNB, communication unit 622 transmits, by way of interface Iuh to the HNB that is the transmission origin of the HNB REGISTER REQUEST message, an HNB REGISTER ACCEPT message that is a response message to the HNB REGISTER REQUEST message and that contains UL scrambling code range that is assigned to that HNB.

Referring to FIG. 26, FIG. 26 is an example of the setting method by which UL scrambling codes are set to an HNB REGISTER ACCEPT message. According to this example, as in FIG. 4, "maxNumofULScramblingCodeRangeLists" that shows the maximum number of Reserved UL Scrambling code ranges that can be reserved is prescribed (in this example, 16). As a result, a number of UL scrambling code ranges that is no greater than this number is reserved as the "Reserved UL Scrambling Code Range List." In addition, as in FIG. 4, a "Reserved UL Scrambling Code Range start" that is the start Number of the starting position of UL scrambling codes and a "Reserved UL Scrambling Code Range Offset" that is the Offset value that shows how many UL scrambling codes are reserved from that point are prescribed for each range.

HNB (#1) 611 includes communication unit 613 and control unit 614.

Communication unit 613 both transmits an HNB REGISTER REQUEST message to HNB-GW 621 and receives an HNB REGISTER ACCEPT message from HNB-GW 621.

Control unit 614, after having received the HNB REGISTER ACCEPT message from HNB-GW 621, assigns to subordinate UE that carries out communication UL scrambling codes that are still unused among the UL scrambling code range that is contained in the HNB REGISTER ACCEPT message.

Figure 27:
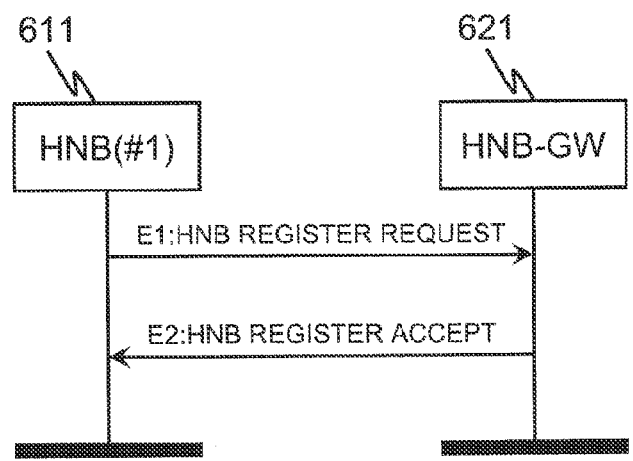
FIG. 27 is a sequence chart showing an example of the operations of the mobile communication system shown in FIG. 24.

The operations of the mobile communication system of the present exemplary embodiment are next described with reference to FIG. 27. It is here assumed that HNB (#1) 611 requests registration.

HNB (#1) 611 transmits an HNB REGISTER REQUEST message to HNB-GW 621 (Step E1).

Upon receiving the HNB REGISTER REQUEST message from HNB (#1) 611, HNB-GW 621 selects a still unused UL scrambling code range that has not been assigned to a subordinate HNB at that point in time and transmits an HNB REGISTER ACCEPT message that contains the selected UL scrambling code range to HNB (#1) 611 (Step E2).

HNB (#1) 611 subsequently assigns to subordinate UE that carries out communication still unused UL scrambling codes from the UL scrambling code range that is contained in the HNB REGISTER ACCEPT message that was received from HNB-GW 621.

In the present exemplary embodiment as described hereinabove, HNB-GW at the time of execution of HNB Registration assigns to subordinate HNB UL scrambling code ranges that are to be used in these HNBs, whereby duplication of UL scrambling codes by an HNB with a neighboring HNB can be avoided.

Seventh Exemplary Embodiment

Figure 28:
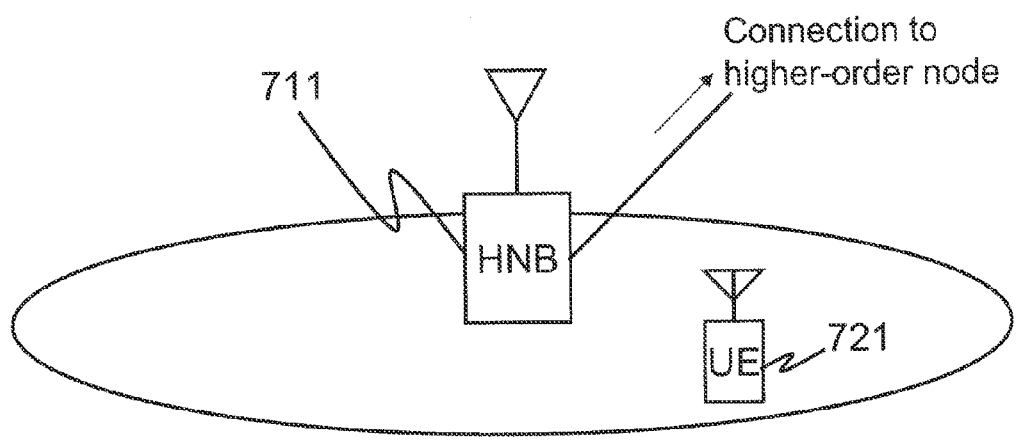
FIG. 28 shows the configuration of the mobile communication system of the seventh exemplary embodiment of the present invention.

Referring to FIG. 28, the configuration of a portion of the mobile communication system of the present exemplary embodiment is shown.

The mobile communication system of the present exemplary embodiment includes HNB 711 and UE 721 that carries out radio communication with HNB 711.

In the present exemplary embodiment, newly defining the assignment logic of UL scrambling codes enables avoidance of the duplication of UL scrambling codes without exchanging information among HNBs.

Figure 29:
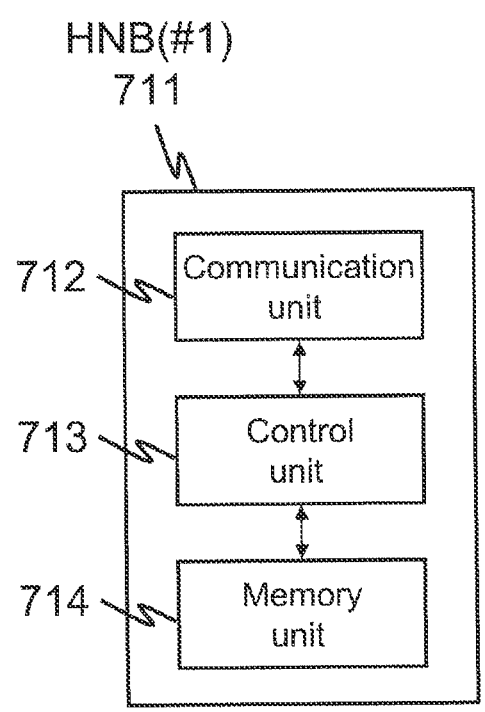
FIG. 29 shows an example of the configuration of the HNB shown in FIG. 28.

Referring to FIG. 29, the configuration of HNB 711 is shown.

HNB 711 includes communication unit 712, control unit 713, and memory unit 714.

Communication unit 712 reports any message such as a System Information message within its own cell when in the operating state.

In addition, communication unit 712 receives messages that are reported by a neighboring HNB when executing the network listening mode.

Control unit 713 determines the UL scrambling code range that is to be used within its own cell in accordance with the newly defined assignment logic.

More specifically, control unit 713 first sets in its own cell DL scrambling code of a DL Scrambling Code Group that differs from the DL scrambling codes being used in the neighboring HNB and then sets the primary scrambling code that is set in its own cell to bits that make up the UL scrambling codes. In this way, the duplication of UL scrambling codes is avoided.

Memory unit 714 stores the UL scrambling code range that is used in its own cell.

Three examples by which HNB 711 determines a UL scrambling code range are next described.

(A) FIRST EXAMPLE

The number of DL scrambling codes and the number of DL scrambling code groups in each cell as well as the method of assigning PRACH UL scrambling codes are as described in the section of the background art. In addition, the composition of UL scrambling codes from 24 bits and the composition of DL scrambling codes from 512 (9-bit) groups are as described in the section of the background art.

HNB 711 first recognizes the DL scrambling codes that are being used in neighboring cells by means of the network listening mode. HNB 711 then selects the DL scrambling code group that is to be used in its own cell such that duplication with a DL scrambling code group of a neighboring cell does not occur. The remaining operations are known operations.

Figure 30:
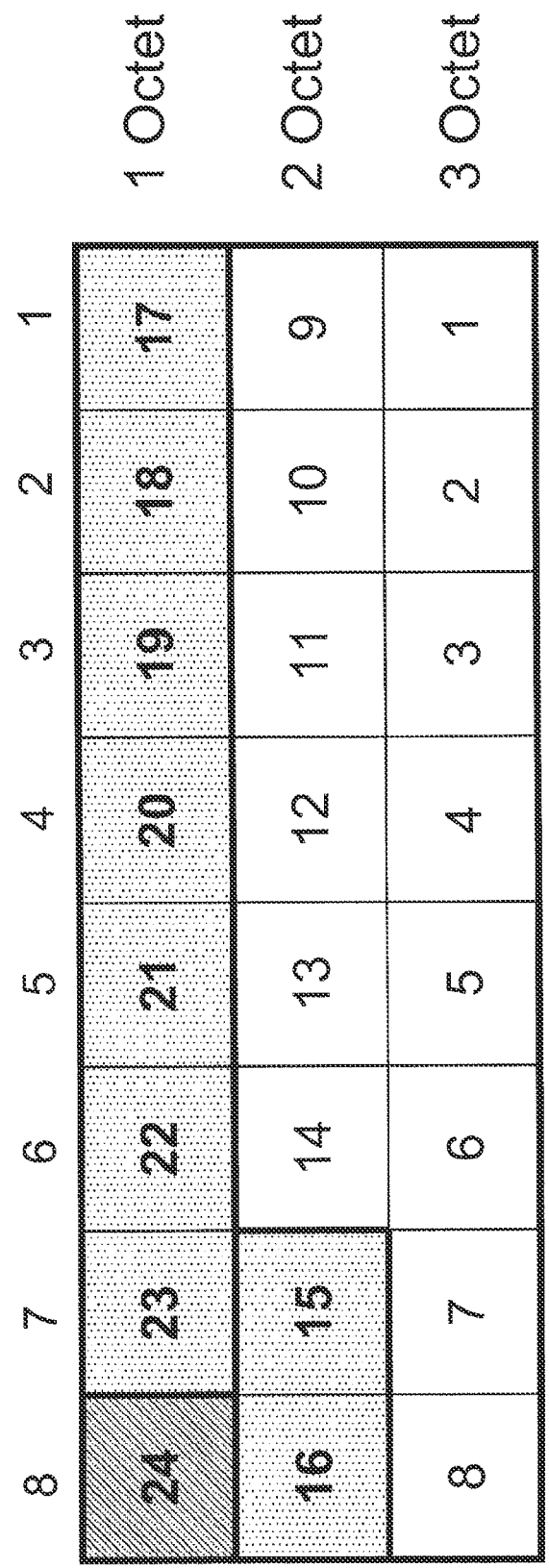
FIG. 30 shows a first example of the determination method by which the HNB shown in FIG. 28 determines a UL scrambling code range.

As shown in FIG. 30, HNB 711 includes the primary scrambling code of the DL scrambling code group that was selected above within the 24 bits that make up the UL scrambling codes that are used in its own cell.

To state in greater detail, HNB 711 fixedly sets "1" to the 24th most significant bit in order to avoid code conflict with PRACH UL scrambling codes (0-8191). HNB 711 further sets the value of the primary scrambling code of the DL scrambling code group that is used in its own cell to the nine bits from the 23rd bit to the 15th bit (setting to 000000000 in the case of the 0th Group). The 14th bit to the 1st bit is a UL scrambling code range that can be used freely in its own cell. For example, when the DL scrambling code group is the 0th Group, the UL scrambling code range of 8388608-8404991 can be used.

In the present example, each HNB determines the UL scrambling code range that is to be used in its own cell in accordance with this assignment logic, whereby the conflict of UL scrambling codes among the HNBs can be avoided.

In addition, in the present example, in contrast with, for example, the second exemplary embodiment, the determined UL scrambling code range need not be reported to other HNBs.

(B) SECOND EXAMPLE

In the first example, "1" was fixedly set to the 24th bit in order to avoid code conflict with PRACH UL scrambling codes (0-8191), but in the present example, this bit is not set.

In the present example, HNB 711 sets the primary scrambling code of the DL scrambling code group that is to be used in its own cell to the nine bits from the 24th bit to the 16th bit as shown in FIG. 31.

In the present example, the use of the range of the PRACH UL scrambling codes from 0-8191 that can be used in its own station must be avoided, but the UL scrambling code range that can be used is one bit greater than in the first example.

(C) THIRD EXAMPLE

Figure 32:
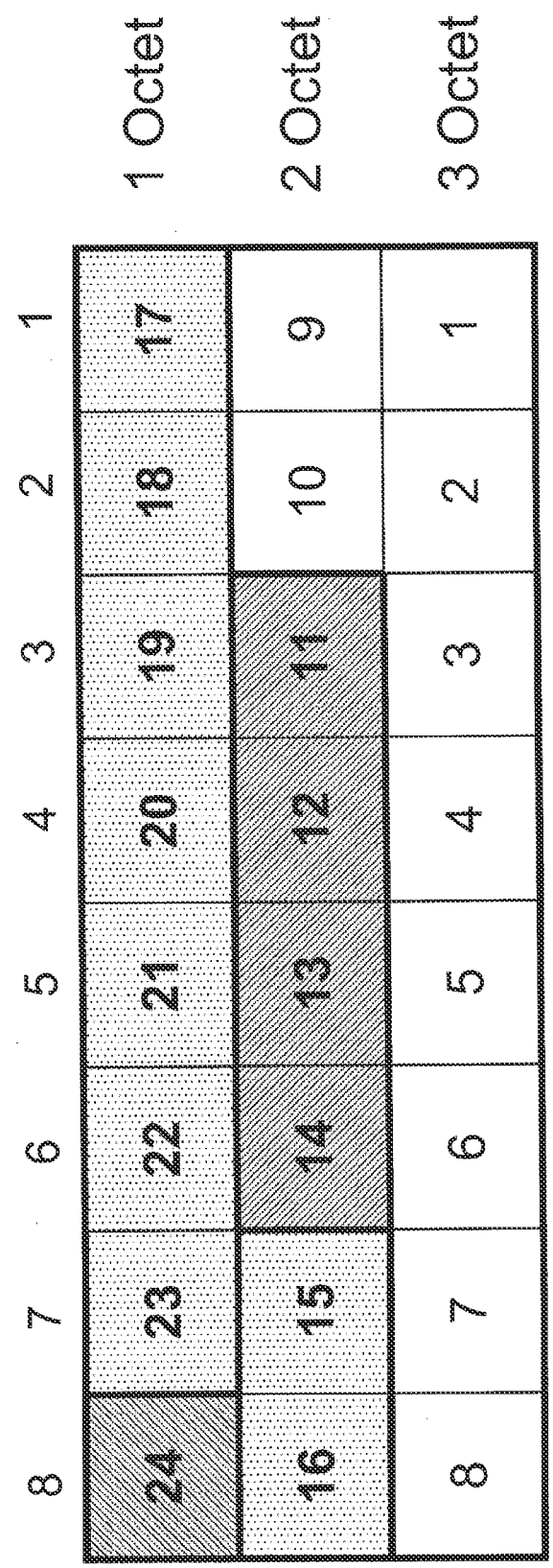
FIG. 32 shows a third example of the determination method by which the HNB shown in FIG. 28 determines a UL scrambling code range.

As shown in FIG. 32, in the present example, HNB 711 fixedly sets the 24th bit to "1" as in the first example and sets the primary scrambling code of the DL scrambling code group to the nine bits from the 23rd bit to the 15th bit. In addition, the PRACH UL Scrambling Code Number is assigned to the four bits from the 14th bit to the 11th bit.

As described hereinabove, it is prescribed in the 3GPP standards that there are 8192 PRACH UL scrambling codes, that these codes are divided into 512 groups of 16 (4-bit) codes each, and that the codes that are used are within the same group as the DL scrambling code group of its own cell. The ordinal number of the code among these groups that is to be used depends on the device of each vendor.

In the present example, by including the PRACH UL scrambling codes that are to be used in its own cell in the UL scrambling code range, duplication of the UL scrambling code range can be avoided even in the event of duplication of the DL scrambling codes.

Still further, the methods carried out in the HNB, HNB-GW, and HMS of the present invention may be applied in a program that is executed by a computer. This program can further be stored in a memory medium, and can be provided to the outside by way of a network.

Although the present invention has been described hereinabove with reference to exemplary embodiments, the present invention is not limited to the above-described exemplary embodiments. The constitution and details of the present invention are open to various modifications within the scope of the present invention that will be clear to anyone of ordinary skill in the art.

This application claims the benefits of priority based on Japanese Patent Application No. 2009-184758 for which application was submitted on Aug. 7, 2009 and incorporates by citation all of the disclosures of that application.

What is claimed is:

1. A mobile communication system, comprising:
   a plurality of terminals;
   a plurality of femtocell base stations that use scrambling codes to carry out radio communication with said terminals; and
   a higher-order apparatus that has under its control said plurality of femtocell base stations,
   wherein said higher-order apparatus:
   records in advance in a first database, for each hardware version that shows a type of hardware of said femtocell base stations, the maximum number of uplink scrambling codes that are requested by a femtocell base station of that type,
   each time when the range of uplink scrambling codes that can be used in one subordinate femtocell base station of a plurality of subordinate femtocell base stations is assigned, records in a second database information of the range of uplink scrambling codes that was assigned,
   assigns, as the range of uplink scrambling codes that can be used in one of the subordinate femtocell base stations, a range that includes a maximum number, which is recorded in said first database, of uplink scrambling codes from among uplink scrambling codes that have not been recorded in said second database,
   assigns to the subordinate femtocell base stations uplink scrambling codes that have not yet been assigned to other femtocell base stations as the uplink scrambling codes that can be used in the subordinate femtocell base stations, and
   transmits to the subordinate femtocell base stations information of said uplink scrambling codes that have been assigned.

2. The mobile communication system as set forth in claim 1, wherein said higher-order apparatus:
   assigns to the subordinate femtocell base stations ranges of uplink scrambling codes that have not yet been assigned to other femtocell base stations as ranges of uplink scrambling codes that can be used in the subordinate femtocell base stations, and
   accesses subordinate femtocell base stations and writes, to a data model of the subordinate femtocell base stations, information of said ranges of uplink scrambling codes that have been assigned.

3. The mobile communication system as set forth in claim 1, wherein said higher-order apparatus:
   at the time of registration of one of said terminals, assigns to one of the subordinate femtocell base stations that has received a registration request from the terminal uplink scrambling codes that have not yet been assigned to other femtocell base stations as the uplink scrambling codes that can be used in the subordinate femtocell base station; and
   transmits to the subordinate femtocell base station that has received the registration request from said one terminal, a message containing information of said uplink scrambling codes that have been assigned.

4. The mobile communication system as set forth in claim 3, wherein said higher-order apparatus:
   each time when uplink scrambling codes that can be used in one of the subordinate femtocell base stations is assigned, records in a database information of the uplink scrambling codes that were assigned, and at the time of registration of the one of said terminals, assigns from among uplink scrambling codes that have not been recorded in said database uplink scrambling codes that can be used in the subordinate femtocell base station that received the registration request from the one terminal.

5. The mobile communication system as set forth in claim 1, wherein said higher-order apparatus:
at the time of registration of one of the subordinate femtocell base stations, assigns to the subordinate femtocell base stations a range of uplink scrambling codes that have not yet been assigned to other femtocell base stations as the range of uplink scrambling codes that can be used in that subordinate femtocell base station, and
transmits to the subordinate femtocell base stations a message containing information of said range of uplink scrambling codes that was assigned.

6. The mobile communication system as set forth in claim 5, wherein said higher-order apparatus:
each time when a range of uplink scrambling codes that can be used in one of the subordinate femtocell base stations is assigned, records in a database information of the range of uplink scrambling codes that were assigned, and
at the time of registration of one of the subordinate femtocell base stations, assigns from among uplink scrambling codes that have not been recorded in said database a range of uplink scrambling codes that can be used in the subordinate femtocell base station.

7. The mobile communication system as set forth in claim 1, wherein said uplink scrambling codes are uplink Dedicated Physical Channels (DPCH) scrambling codes.

8. A mobile communication system, comprising:
a plurality of terminals; and
a plurality of femtocell base stations that use scrambling codes to carry out radio communication with said terminals,
wherein each of said plurality of femtocell base stations:
when determining the range of scrambling codes of a first physical channel for uplink that is used in its own station, sets downlink scrambling codes of a group that differs from the downlink scrambling codes that are used in neighboring femtocell base stations, and
sets the primary scrambling code for downlink that is set to its own station in bits that make up the scrambling codes of the first physical channel for uplink that is used in its own station,
wherein the range of scrambling codes for uplink is assigned based on a hardware version that shows a type of hardware of the femtocell base station.

9. The mobile communication system as set forth in claim 8, wherein each of said plurality of femtocell base stations:
sets "1" to the most significant bit that makes up the scrambling codes of the first physical channel for uplink that is used in its own station, and
sets the downlink primary scrambling code that is set in its own station to the other bits.

10. The mobile communication system as set forth in claim 8, wherein each of said plurality of femtocell base stations:
sets the primary scrambling code for downlink that is set in its own station to, from among bits that make up the scrambling codes of a first physical channel for uplink that is used in its own station, the most significant bit and bits up to the bit that is a predetermined number of places from the most significant bit, and
sets to other bits codes other than the scrambling codes of a second physical channel for uplink that can be used in its own station.

11. The mobile communication system as set forth in claim 8, wherein each of said plurality of femtocell base stations:
sets "1" to the most significant bit that makes up scrambling codes of a first physical channel for uplink that is used in its own station, and
sets to other bits the primary scrambling code for downlink that is set in its own station and scrambling codes of a second physical channel for uplink that is set in its own station.

12. The mobile communication system as set forth in claim 8, wherein scrambling codes of a first physical channel for uplink are uplink Dedicated Physical Channels (DPCH) scrambling codes.

13. The mobile communication system as set forth in claim 10, wherein:
said scrambling codes of a first physical channel for uplink are uplink Dedicated Physical Channels (DPCH) scrambling codes; and
scrambling codes of a second physical channel for uplink are uplink Physical Random Access Channels (PRACH) scrambling codes.

14. A femtocell base station that uses scrambling codes to carry out radio communication with terminals, the femtocell base station comprising:
a scrambling code setting controller, when determining a range of scrambling codes of a first physical channel for uplink that is to be used in the femtocell base station of the scrambling code setting controller, configured to set downlink scrambling codes of a group that differs from downlink scrambling codes that are used in neighboring femtocell base stations, and configured to set the primary scrambling code for downlink that is set in the femtocell base station of the scrambling code setting controller to bits that make up the scrambling codes of a first physical channel for uplink that is used in the femtocell base station of the scrambling code setting controller; and
a transmission device configured to transmit information of the range of scrambling codes for uplink that have been determined,
wherein the range of scrambling codes for uplink is assigned to the femtocell base station based on a hardware version that shows a type of hardware of the femtocell base station.

15. A higher-order apparatus configured to control a plurality of femtocell base stations that use scrambling codes to carry out radio communication with terminals, the higher-order apparatus comprising:
a scrambling code assigning controller configured to assign to subordinate femtocell base stations uplink scrambling codes that have not yet been assigned to other femtocell base stations as uplink scrambling codes that can be used in the subordinate femtocell base stations; and
a transmission device configured to transmit to the subordinate femtocell base stations information of said uplink scrambling codes that have been assigned, wherein the higher-order apparatus:
records in advance in a first database, for each hardware version that shows a type of hardware of said femtocell base stations, the maximum number of uplink scrambling codes that are requested by a femtocell base station of that type, each time when the range of uplink scrambling codes that can be used in one of the subordinate femtocell base stations is assigned, records in a second database information of the range of uplink scrambling codes that was assigned, and assigns, as the range of uplink scrambling codes that can be used in one of the subordinate femtocell base stations, a range that includes a maximum number, which is recorded in said first database, of uplink scrambling codes from among uplink scrambling codes that have not been recorded in said second database.

16. A communication method that is realized by a mobile communication system that includes a plurality of terminals, and a plurality of femtocell base stations that use scrambling codes to carry out radio communication with said terminals, the communication method comprising:

when determining the range of scrambling codes of a first physical channel for uplink that is to be used in its own station, setting downlink scrambling codes of a group that differs from downlink scrambling codes that are used in neighboring femtocell base stations by each of the femtocell base stations; and setting the primary scrambling code for downlink that is set in its own station to bits that make up scrambling codes of a first physical channel for uplink that is used in its own station by each of the femtocell base stations, wherein the range of scrambling codes for uplink is assigned based on a hardware version that shows a type of hardware of the femtocell base station.

17. A communication method that is realized by a mobile communication system that includes a plurality of terminals, a plurality of femtocell base stations that use scrambling codes to carry out radio communication with said terminals, and a higher-order apparatus that is configured to control the plurality of femtocell base stations, the communication method comprising:

recording in advance in a first database, for each hardware version that shows a type of hardware of the femtocell base stations, the maximum number of uplink scrambling codes that are requested by a femtocell base station of that type, by the higher-order apparatus;

each time when the range of uplink scrambling codes that can be used in one of the subordinate femtocell base stations is assigned, recording in a second database information of the range of uplink scrambling codes that was assigned by the higher-order apparatus;

assigning, as the range of uplink scrambling codes that can be used in one of the subordinate femtocell base stations, a range that includes a maximum number, which is recorded in said first database, of uplink scrambling codes from among uplink scrambling codes that have not been recorded in said second database by the higher-order apparatus;

assigning, by the higher-order apparatus to the subordinate femtocell base stations, uplink scrambling codes that have not yet been assigned to other femtocell base stations as uplink scrambling codes that can be used by the subordinate femtocell base stations; and transmitting, by the higher-order apparatus to the subordinate femtocell base stations, information of said uplink scrambling codes that have been assigned.

18. A communication method realized by a femtocell base station that uses scrambling codes to carry out radio communication with a plurality of terminals, the communication method comprising:

when determining the range of scrambling codes of a first physical channel for uplink to be used in its own station, setting downlink scrambling codes of a group that differs from downlink scrambling codes that are used by neighboring femtocell base stations; and setting the primary scrambling code for downlink that is set in its own station to bits that make up the scrambling codes of a first physical channel for uplink that is used in its own station, wherein the range of scrambling codes for uplink is assigned based on a hardware version that shows a type of hardware of the femtocell base station.

19. A communication method realized by a higher-order apparatus that is configured to control a plurality of femtocell base stations that use scrambling codes to carry out radio communication with a plurality of terminals, the communication method comprising:

recording in advance in a first database, for each hardware version that shows a type of hardware of said femtocell base stations, the maximum number of uplink scrambling codes that are requested by a femtocell base station of that type;

each time when the range of uplink scrambling codes that can be used in one of a plurality of subordinate femtocell base stations is assigned, recording in a second database information of the range of uplink scrambling codes that was assigned;

assigning, as the range of uplink scrambling codes that can be used in one of the subordinate femtocell base stations, a range that includes a maximum number, which is recorded in said first database, of uplink scrambling codes from among uplink scrambling codes that have not been recorded in said second database;

assigning to the subordinate femtocell base stations uplink scrambling codes that have not yet been assigned to other femtocell base stations as uplink scrambling codes that can be used in the subordinate femtocell base stations; and transmitting to the subordinate femtocell base stations information of said uplink scrambling codes that have been assigned.

* * * * *